(12) United States Patent
Toth et al.

(10) Patent No.: US 10,830,159 B2
(45) Date of Patent: Nov. 10, 2020

(54) VALVE-ACTUATING DEVICE FOR VARYING THE VALVE LIFT

(71) Applicant: AVL LIST GMBH, Graz (AT)

(72) Inventors: Gyula Toth, Nagytarcsa (HU); Michael Groeger, Proleb (AT)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 14/911,659

(22) PCT Filed: Aug. 12, 2014

(86) PCT No.: PCT/EP2014/002214
§ 371 (c)(1),
(2) Date: Feb. 11, 2016

(87) PCT Pub. No.: WO2015/022071
PCT Pub. Date: Feb. 19, 2015

(65) Prior Publication Data
US 2016/0281612 A1   Sep. 29, 2016

(30) Foreign Application Priority Data

Aug. 12, 2013 (DE) .................. 10 2013 215 946

(51) Int. Cl.
*F02D 13/04* (2006.01)
*F01L 13/06* (2006.01)
(Continued)

(52) U.S. Cl.
CPC ................ *F02D 13/04* (2013.01); *F01L 1/18* (2013.01); *F01L 13/065* (2013.01); *F01L 13/08* (2013.01);
(Continued)

(58) Field of Classification Search
CPC . F02D 13/04; F02D 21/08; F01M 9/10; F01L 13/08; F01L 1/18; F01L 13/065; F01L 2001/186; Y02T 10/142
See application file for complete search history.

(56) References Cited

U.S. PATENT DOCUMENTS 5,107,803 A    4/1992  Furnivall
6,000,374 A   12/1999  Cosma et al.
(Continued)

FOREIGN PATENT DOCUMENTS

CN    102597434    7/2012
CN    102767408    11/2012
(Continued)

OTHER PUBLICATIONS

International Search Report prepared by the European Patent Office dated Dec. 16, 2014, for International Application No. PCT/EP2014/002214.
(Continued)

*Primary Examiner* — Joseph J Dallo
*Assistant Examiner* — Kurt Philip Liethen
(74) *Attorney, Agent, or Firm* — Sheridan Ross P.C.

(57) ABSTRACT

The invention relates to a valve-actuating device (1) for actuating at least one first valve of a reciprocating piston machine, in particular an internal combustion engine, which valve-actuating device can be used in particular for engine braking and comprises a first rocker arm part (2), a second rocker arm part (3), and a first switching element (6) for changing the valve stroke (H) of the at least one first valve (5), wherein the first rocker arm part (2) and the second rocker arm part (3) are pivotably supported and are arranged in such a way that at least one first valve control motion of
(Continued)

a first camshaft (4) can be transmitted to the at least one first valve (5) by means of the first rocker arm part (2) and the second rocker arm part (3).

21 Claims, 32 Drawing Sheets

(51) Int. Cl.
    *F01L 1/18*           (2006.01)
    *F01L 13/08*         (2006.01)
    *F01M 9/10*          (2006.01)
    *F02D 21/08*         (2006.01)

(52) U.S. Cl.
    CPC ............... *F01M 9/10* (2013.01); *F02D 21/08* (2013.01); *F01L 2001/186* (2013.01); *Y02T 10/142* (2013.01)

(56) References Cited

U.S. PATENT DOCUMENTS

| | | | |
|---|---|---|---|
| 6,293,248 B1 | 9/2001 | Zsoldos et al. | |
| 6,314,926 B1* | 11/2001 | Meneely | F01L 13/06 123/320 |
| 7,712,449 B1 | 5/2010 | Schwoerer | |
| 8,627,791 B2* | 1/2014 | Janak | F01L 1/181 123/90.16 |
| 8,746,208 B2* | 6/2014 | Moller | F01L 1/181 123/320 |
| 9,016,249 B2* | 4/2015 | Roberts | F01L 1/08 123/90.16 |
| 9,163,566 B2* | 10/2015 | Le Forestier | F01L 13/0021 |
| 9,371,780 B2* | 6/2016 | Toth | F01L 1/181 |
| 2003/0024501 A1* | 2/2003 | McCarthy | F01L 13/065 123/321 |
| 2006/0037578 A1* | 2/2006 | Nakamura | F02D 41/0002 123/198 F |
| 2007/0095312 A1* | 5/2007 | Vanderpoel | F01L 1/047 123/90.16 |
| 2010/0108007 A1 | 5/2010 | Meistrick et al. | |
| 2014/0165937 A1* | 6/2014 | Vorih | F01L 1/185 123/90.12 |

FOREIGN PATENT DOCUMENTS

| | | |
|---|---|---|
| DE | 3936808 A1 | 8/1990 |
| DE | 4025569 C1 | 7/1991 |
| DE | 19961795 A1 | 6/2000 |
| DE | 10047141 A1 | 3/2001 |
| DE | 69329064 T2 | 3/2001 |
| DE | 112004001450 T5 | 6/2006 |
| DE | 102011118537 A1 | 11/2012 |
| DE | 112012000820 T5 | 11/2013 |
| EP | 0167267 A1 | 1/1986 |
| EP | 2520773 A2 | 12/2011 |
| WO | WO 2012038190 A1 | 3/2012 |
| WO | WO 2012038191 A1 | 3/2012 |
| WO | WO 2012038195 A1 | 3/2012 |
| WO | WO 2012067610 A1 | 5/2012 |
| WO | WO 2012162616 A1 | 5/2012 |
| WO | WO 2012174697 A1 | 12/2012 |
| WO | WO 2013005070 A1 | 1/2013 |

OTHER PUBLICATIONS

Search Report prepared by the German Patent Office dated Jul. 18, 2014, for German Patent Application No. 10 2013 215 946.3.
Official Action for China Patent Application No. 201480055195.8, dated Aug. 2, 2017, 10 pages.
Official Action with machine translation for European Patent Application No. 14752274.2, dated May 29, 2018, 9 pages.
Official Action with Machine Translation for European Patent Application No. 14752274.2, dated May 9, 2019, 12 pages.

* cited by examiner

VALVE-ACTUATING DEVICE FOR VARYING THE VALVE LIFT

CROSS REFERENCE TO RELATED APPLICATIONS

This application is a national stage application under 35 U.S.C. 371 and claims the benefit of PCT Application No. PCT/EP2014/002214 having an international filing date of 12 Aug. 2014, which designated the United States, which PCT application claims the benefit of German Patent Application No. 10 2013 215 946.3 filed Aug. 12, 2013, the disclosures of each are incorporated by reference herein.

The invention relates to a valve-actuating device having a first switching element for varying the valve lift of at least one first valve.

Due to ever higher demands in terms of performance, efficiency and emissions, the significance of variable valve trains to internal combustion engines, particularly those of four-stroke operation, is increasingly growing.

Variable valve trains can thereby satisfy the need of engine designers and the desire of thermo-dynamicists to alternatively transmit different valve lift curves to an engine valve, wherein both the valve lift as well as also the opening and closing points can be adapted. This is generally achieved by shifting the valve train's transmission path. Lift switching and cut-out systems with switchable cam followers such as bucket tappets, roller tappets or rocker arms are standard in various different applications. Hereby applicable is that for each further alternative valve lift, a corresponding cam also needs to be provided as the lift-supplying element—unless the alternative lift is zero.

There are thereby completely different fields of application in which variable valve trains can be used. A few examples are listed below:

Lift switching: Lift switching enables the operating point-dependent use of at least two different valve lifts. A smaller valve lift specially adapted to the partial load operational range is utilized here, which improves the torque curve and reduces consumption and emissions. The larger valve lift can be optimized to further increases in performance. A smaller valve lift with lower maximum lift and shorter event length based on a considerably earlier intake closing point and intake system dethrottling enables the work of the load cycle to be decreased (Miller cycle). Similar results are possible with the Atkinson cycle; i.e. extremely delayed intake closing. Optimum filling of the combustion chamber thereby also effects an increase in torque in the partial load range.

Cylinder cut-off: Cylinder cut-off is predominantly used in high-volume engines of multiple cylinders (e.g. four, eight, ten or twelve engine cylinders). Selected engine cylinders are thereby closed down by cutting the lift at the intake and exhaust valves; a complete decoupling of cam lift thereby occurs. Because the timing sequences are equally spaced, conventional V8 and V12 engines can thereby be switched to A4 or R6 engines. The aim of engine cylinder cut-off is minimizing load cycle losses and effecting a shift in the operating point to higher mean pressures and thus higher levels of thermodynamic efficiency, whereby substantial fuel savings can be achieved.

Engine braking mode: Providing additional macro valves in the engine cylinders of an internal combustion engine is known, in which so-called decompression braking can be effected by the additional engine valves realizing a decompression of the cylinder at the end of a four-stroke engine's compression stroke; i.e. at the end of the second stroke, whereby the work of the compressed gas is discharged via the exhaust system of the internal combustion engine. The internal combustion engine then also has to work to fill gas back into the cylinder again.

Further known are engine braking systems which achieve the braking effect by means of variable operation of the actual exhaust valves.

Engine braking systems are becoming of increasing importance for motor vehicle internal combustion engines, particularly in commercial vehicles, since they constitute economical and space-saving auxiliary braking systems for same able to take load off the wheel brakes, particularly on long steep slopes. Additionally, the increase in the specific performance of modern commercial vehicle engines also requires an increase in achievable brake performance.

In the context of the above, DE 39 36 808 A1 describes a method for an additional device to improve the often insufficient auxiliary braking effect of combustion engines. This is enabled by the exhaust control somewhat advancing a piston stroke, thus 180° of crankshaft angle (KW) or 90° of camshaft angle (NW) respectively, meaning that the exhaust already opens at the end of the compression stroke and releases the pressurized gas out of the cylinder with the subsequent downstroke of the piston sucking gas back in again through the exhaust. By advancing the exhaust control time, compression occurs during the predefined exhaust stroke of the braking mode during the engine's operative mode since the exhaust valves have ended their opening stroke. The compressed gas escapes when the intake valves are opened, filling then occurs immediately thereafter again with the downstroke of the piston. Each piston stroke in the engine's braking mode thus signifies compression with immediately following discharge of the pressurized, respectively compressed gas.

Also U.S. Pat. No. 6,000,374 relates to a decompression engine braking system, proposing "two-cycle braking" which amplifies the braking effect by generating two braking events, one per crankshaft revolution, for each cylinder of the engine. To this end, a dual camshaft arrangement with an additional rocker arm dedicated to a compression release-type brake of an engine brake assembly is provided.

WO 2012/038190 A1 relates to a four-stroke internal combustion engine having an engine brake, at least one exhaust valve per cylinder actuatable by means of a cam of a camshaft, and at least one first valve lever arrangement, wherein the first valve lever arrangement comprises a first lever arm on the cam side and a second lever arm on the exhaust valve side, and a device for advancing the exhaust control, wherein the first valve lever arrangement comprises a switching member for moving the first lever arm on the cam side between an operative position and a braking position and a cam-operated second valve lever arrangement which acts on the first lever arm of the first valve lever arrangement.

WO 2012/038191 A1 relates to a four-stroke internal combustion engine having an engine brake comprising at least one exhaust valve per cylinder actuatable by means of a camshaft and at least one valve lever arrangement as well as a device for advancing the exhaust control, wherein the valve lever arrangement comprises an exhaust lever actuated by an exhaust cam and a brake lever actuatable by a brake cam, whereby the brake lever is actuatable by means of a switchable first transmission member arranged between the brake lever and brake cam, wherein the brake lever is activated in a first position of the first transmission member and deactivated in a second position of the first transmission member.

WO 2012/038195 A1 relates to a four-stroke internal combustion engine having an engine brake comprising at least one exhaust valve per cylinder actuatable by means of a camshaft and at least one valve lever arrangement as well as a device for advancing the exhaust control, wherein the valve lever arrangement comprises an exhaust lever actuated by an exhaust cam and a brake lever actuatable by a brake cam, whereby the brake lever has a first brake lever part on the camshaft side and a second brake lever part on the exhaust valve side, wherein the two brake lever parts are rotatably mounted about a lever shaft independently of one another and rotatably connectable by means of a blocking element which is displaceable between two positions, wherein the exhaust lever has a first exhaust lever part on the camshaft side and a second exhaust lever part on the exhaust valve side, whereby the two exhaust lever parts are rotatably mounted about the lever shaft independently of one another and rotatably connectable by means of the blocking element when not in engine braking mode.

The prior art systems for realizing variable valve trains independent of the above-cited example applications have a relatively high number of individual parts adding to the other mechanisms of the engine. Particularly engine-braking systems in which additional valves are provided for choking and/or decompressing need to provide all the essential components for a second valve train comprising additional valve-actuating devices. Moreover, individual control electronics are usually provided to control the additional components for the desired application. The additional components and control elements increase the complexity of the internal combustion engine as a whole and lead to greater susceptibility to failure. Manufacturing costs for internal combustion engines with variable valve trains are also higher. This is not least due to the fact that variable valve train systems have a greater constructional complexity which results in their taking up a comparatively great deal of space near the cylinder head. Space is very limited particularly in the region of the cylinder head and many engines simply don't have such space for known variable valve train systems, or can only provide it with great difficulty. Furthermore, an additional high-pressure oil system comprising a high-pressure pump is frequently also provided for hydraulically controlling the additional components. As with any hydraulic system in the vehicle, it is also subject to leakage and thereby further increases the combustion engine's susceptibility to failure.

It is the object of the invention to provide an apparatus of relatively lesser complexity enabling a variable valve train for a reciprocating piston engine, particularly an internal combustion engine, and thereby enabling optimum actuation of the valves, particularly with respect to efficiency, emissions and noise reduction and/or in terms of engine braking operation.

According to the invention, this task is solved by a valve-actuating device in accordance with claims 1 and 45 as well as by a corresponding internal combustion engine in accordance with claim 50. The task is furthermore solved by a corresponding valve control method in accordance with claim 58 and a valve-actuating method in accordance with claim 73. Advantageous embodiments are claimed in the subclaims.

Engine braking in terms of the invention is mechanical resistance opposite to an external torque acting on an internal combustion engine.

A rocker arm part in terms of the invention is a section of a valve lever serving in transmitting motion from a camshaft to a valve of a reciprocating piston engine, particularly an internal combustion engine, wherein the valve lever is in particular configured as a cam follower or rocker arm.

In the terms of the invention, a valve is an engine valve.

In the terms of the invention, a switching valve is a control device exhibiting at least two states, particularly a hydraulic or electric/electronic control device.

An inlet in terms of the invention is an apparatus for transmitting a control pulse from a switching to valve to a switching element, particularly a hydraulic or electrical line.

A valve control motion in terms of the invention is a kinematic event which is in particular produced by a cam on a camshaft and transmitted to a valve. The event is specified in particular by its physical properties, position, velocity and acceleration.

A switching element in terms of the invention is any type of apparatus with which a physical system can be switched between at least two states. The switching element according to the invention is in particular an actuator, a hydraulic element or an electromagnetic element.

A blocking element in terms of the invention is a switching element capable of blocking a further switching element.

An exhaust cam in terms of the invention is a cam of a camshaft having a profile able to produce a valve control motion to control valves during an engine operating mode.

A brake cam in terms of the invention is a cam of a camshaft having a profile able to produce a valve control motion to control valves during an engine braking mode.

An intake cam in terms of the invention is a cam of a camshaft having a profile able to produce a valve control motion to control an engine operating mode.

An AGR cam in terms of the invention is a cam of a camshaft having a profile able to produce a valve control motion during exhaust gas recirculation operating mode.

A Miller cam in terms of the invention is a cam of a camshaft having a profile able to produce a valve control motion during Miller cycle operating mode.

In the terms of the invention, engine operation is a combustion mode of an internal combustion engine, whereby a drive motion is induced.

A rocker arm shaft in terms of the invention is that geometrical axis about which a rocker arm, or a rocker arm part respectively, can be pivoted.

A control fluid in terms of the invention is any type of gas or liquid suited to pneumatically or hydraulically controlling a valve.

A switching valve in terms of the invention is any type of switching mechanism suited to the controlled distribution of a control fluid according to the invention, particularly a hydraulic valve.

The valve-actuating device according to the invention has the advantage of the first rocker arm part and the second rocker arm part being pivotably mounted independently of one another. By so doing, a switching valve motion tapped from the first rocker arm part at a cam of the first camshaft can be selectively relayed to the second rocker arm part. The first switching element moreover enables a discrete or a continuous setting for the valve lift. Providing a switching element can furthermore dynamically even out valve play.

In one advantageous embodiment of the valve-actuating device, the first switching element is arranged between the first rocker arm part and the second rocker arm part. This arrangement of the first switching element enables the switching element to control the selective transmission of the first valve control motion from the first rocker arm part to the second rocker arm part.

In a further advantageous embodiment of the valve-actuating device, the first switching element can discretely or continuously set a first angle between the first rocker arm part and the second rocker arm part relative to a rocker arm shaft. This first angle variability can realize an unlocked state of the first rocker arm part relative to the second rocker arm part which results in "lost motion" of the second rocker arm part, resulting in zero first valve lift. Variable valve lift for the first valve is furthermore possible by selecting continuous switching positions for the first switching element.

In a further advantageous embodiment of the valve-actuating device of the invention, the valve-actuating device comprises a second switching element, its effective direction substantially parallel to the direction of the valve lift motion of the first valve. This second switching element enables the achieving of a further change in the valve lift and/or the valve opening/closing points independently of the first switching element's switch position.

In a further advantageous embodiment of the valve-actuating device, the first switching element comprises a first piston and a first cylinder and/or the second switching element comprises a second piston and a second cylinder for hydraulic control.

In a further advantageous embodiment of the valve-actuating device, the first cylinder comprises a first check valve arrangement loaded at a first closing force. The check valve arrangement prevents the first switching element from changing state when the pressure of a control fluid decreases or when the load of the first switching element exceeds the first switching element's actuating force as provided by the pressure of the control fluid.

In a further advantageous embodiment of the valve-actuating device, the first cylinder is allocated a first auxiliary cylinder having a first auxiliary piston loaded at a first opening force which is in particular greater than the first closing force and an actuating element, wherein the first auxiliary piston and the actuating element can convey the first check valve arrangement into an opening position. Providing the auxiliary piston with actuating element enables the controlled switching of the first switching element.

In a further advantageous embodiment, the first cylinder and the first auxiliary cylinder are fluidly connected. This connection allows the first switching element as well as the actuating element to be controlled by just one control fluid.

In a further advantageous embodiment of the valve-actuating device, the first cylinder and the first auxiliary cylinder are arranged substantially on the same axis.

In a further advantageous embodiment, the valve-actuating device comprises a first blocking element, wherein the first blocking element can fix the first switching element in a defined position. Fixing the first switching element in one position can mechanically maintain its state even upon control of the control fluid failing or being stopped for reasons of energy efficiency.

In a further advantageous embodiment, the blocking element is arranged substantially perpendicular to the axis of the first cylinder.

In a further advantageous embodiment of the valve-actuating device, the first switching element and/or the second switching element are arranged on the second rocker arm part. Arranging the two switching elements on the second rocker arm part consolidates the entire mechanism for realizing the variable valve train on the second rocker arm part. Doing so achieves increased system integration. For example, upon a malfunction attributable to the first or the second switching element, only the second rocker arm part needs to be replaced in this arrangement.

Inlets for controlling the switching elements also only need to run through the second rocker arm part, whereby the first rocker arm part can be of substantially simpler manufacture.

In a further advantageous embodiment of the valve-actuating device, the first switching element and the second switching element are fluidly connected, particularly by a first connecting line.

This fluidic connection enables the first and the second switching element to be controlled by a single control fluid.

In a further advantageous embodiment of the valve-actuating device, the first camshaft is configured in the region of the first rocker arm part tapping the first valve control motion such that the first valve's lift curve corresponds to that of an exhaust valve in braking mode, particularly as a brake cam, in engine operation, particularly as an exhaust cam, or in exhaust gas recirculation mode, particularly as an AGR cam, or that of an intake valve in engine operation, particularly as an intake cam, in Miller cycle operation, particularly as a Miller cam, or in exhaust gas recirculation mode, particularly as an intake AGR cam.

In a further advantageous embodiment of the valve-actuating device, the valve-actuating device further comprises a valve bridge arranged between at least two first valves and operatively connecting the second rocker arm part to the first valves. This operative connection enables the two first valves to be actuated by a single valve control motion.

In a further advantageous embodiment of the valve-actuating device, the first valves are operatively connected to the valve bridge by means of first joints. Providing joints between the valves and the valve bridge enables actuating one of the first respective valves independently from the other of the first valves despite the presence of the valve bridge. It is not necessary in this embodiment to provide a passage through the valve bridge, e.g. a hole, for this purpose.

In a further advantageous embodiment of the valve-actuating device, the second piston of the second switching element has a larger effective area than the first piston of the first switching element. Because of its larger effective area, the second piston can achieve greater torque.

According to the invention, when both pistons are in position with the corresponding counterparts, this has the effect of the second piston achieving its maximum extended position first at the expense of the first piston's extended position.

In a further advantageous embodiment of the valve-actuating device, the second rocker arm part comprises a first limit stop and a second limit stop for actuating the at least one first valve, whereby the second stop can be actuated by the second switching element. By providing two stops, the second rocker arm part can exert a force at two points of the valve bridge.

In a further advantageous embodiment of the valve-actuating device, the second stop is to arranged substantially centrically on the valve bridge and/or the first stop is arranged substantially above a first valve. Arranging the first stop above at least one first valve achieves being able to actuate this valve independently of the other first valve. The centric arrangement of the second stop on the valve bridge furthermore enables being able to actuate both first valves simultaneously. Arranging the two stops in this way has the advantage of the movement of the first stop also setting the center of the valve bridge into motion at substantially half the velocity of the first stop, when the one valve is actuated first and then both of the valves such that the relative velocity of the second stop coming into contact the valve bridge is reduced.

In a further advantageous embodiment of the valve-actuating device, the first stop acts on the valve bridge and the second stop acts directly on an at least one first valve. These different operative connections enable actuating the one valve independently of the valve bridge.

In a further advantageous embodiment of the valve-actuating device, both stops act on the valve bridge. The valve bridge can thereby be actuated by both stops independently of each other.

In a further advantageous embodiment of the valve-actuating device, the respective first stop and/or second stop comprises a second joint. The second joint allows the respective stop to positively engage with the valve bridge depending on the position of said valve bridge.

In a further advantageous embodiment of the valve-actuating device, the valve-actuating device comprises a third switching element arranged on the second rocker arm part. Providing the third switching element on the second rocker arm part enables the second rocker arm part to be actuated selectively and independently of the first rocker arm part by means of a further rocker arm part or another mechanism for producing or transmitting motion.

In a further advantageous embodiment of the valve-actuating device, the third switching element comprises a third piston and a third cylinder for hydraulic control.

In a further advantageous embodiment of the valve-actuating device, the effective direction of the first switching element and/or the second switching element and/or the third switching element exhibits a component perpendicular to the rocker arm shaft, in particular substantially tangential to a circle about the rocker arm shaft. This alignment to the effective direction of the switching element can effect an angular displacement of the second rocker arm part about the rocker arm shaft relative to a stationary object, particularly the first rocker arm part, by the switching element being brought into an extended position.

In a further advantageous embodiment of the valve-actuating device, the effective direction of the first switching element and/or the second switching element and/or the third switching element exhibits at least one component parallel to the direction of movement of the first rocker arm part and the second rocker arm part.

In a further advantageous embodiment of the valve-actuating device, the effective direction of the first switching element and the second switching element are at a second angle to one another of approximately 80° to 100°, preferentially approximately 85° to 95° and most preferentially approximately 90°. In a further advantageous embodiment of the valve-actuating device, one axis of the first switching element and one axis of the second switching element are at a second angle to one another of approximately 80° to 100°, preferentially approximately 85° to 95° and most preferentially approximately 90°. Doing so can achieve a particularly advantageous translational movement of the two switching elements in relation to each other.

In a further advantageous embodiment of the valve-actuating device, the valve-actuating device further comprises a third rocker arm part, a fourth rocker arm part and a third switching element for varying the valve lift of the at least one first valve, wherein the third rocker arm part and the fourth rocker arm part are pivotably mounted and arranged such that at least one second valve control motion can be transmitted from the first camshaft or a second camshaft to at least one first valve via the first rocker arm part and second rocker arm part and/or via the third rocker arm part and the fourth rocker arm part. This embodiment provides the possibility of transmitting a second valve control motion to the at least one first valve. Thus, respectively different valve control motions can be transmitted to the first valve by the respective states of the first switching element and the third switching element. Doing so can realize the greatest possible variety of different valve lift curves enabling normal engine operation, engine braking mode, Miller cycle operation or even exhaust gas recirculation mode, etc.

In a further advantageous embodiment of the valve-actuating device, the third switching element is arranged between the third rocker arm part and the fourth rocker arm part.

In a further advantageous embodiment of the valve-actuating device, the second rocker arm part and the fourth rocker arm part are formed integrally. Realizing the two rocker arm parts as one rocker arm part achieves further system integration. All the switching elements involved in the actuation of the at least one first valve can be integrated into this rocker arm part. Thus only this rocker arm part also needs to have hydraulic inlets and hydraulic elements as well as any applicable electrical lines and components. Should one of these control elements malfunction, it can thus be assured that it is attributable to this integrated rocker arm part. Furthermore, the number of moving parts on the valve-actuating device can be reduced.

In a further advantageous embodiment of the valve-actuating device, the first camshaft or the second camshaft is configured in the region of the second valve control motion being tapped by the third rocker arm part such that the opening points of the at least one first valve correspond to that of an exhaust valve in engine operation, particularly as exhaust cam. The respective rocker arm parts can thus transmit different cam profiles as valve control motions.

In a further advantageous embodiment of the valve-actuating device, the valve-actuating device further comprises a fifth rocker arm part, a sixth rocker arm part and a fourth switching element for varying the valve lift of at least one second valve, wherein the fifth rocker arm part and the sixth rocker arm part are pivotably mounted and arranged such that at least one third valve control motion can be transmitted from a first camshaft or a second camshaft to the at least one second valve via the fifth rocker arm part and sixth rocker arm part. By providing a fifth and sixth rocker arm part, a third valve control motion can now be transmitted to at least one second valve.

In a further advantageous embodiment of the valve-actuating device, the fourth switching element is arranged between the fifth rocker arm part and the sixth rocker arm part.

In a further advantageous embodiment of the valve-actuating device, the first camshaft or the second camshaft is configured in the region of valve control motion being tapped by the fifth rocker arm part such that the opening points of the second valve correspond to that of an intake valve in engine operation, particularly as intake cam.

In a further advantageous embodiment of the valve-actuating device, the valve-actuating device further comprises a seventh rocker arm part, an eighth rocker arm part and a fifth switching element for varying the valve lift of the at least one second valve, wherein the seventh rocker arm part and the eighth rocker arm part are pivotably mounted and arranged such that at least one fourth valve control motion can be transmitted from the first camshaft or the second camshaft to at least one second valve via the seventh rocker arm part and the eighth rocker arm part. By providing the seventh and eighth rocker arm part, a fourth valve control motion can be transmitted to the at least one second valve.

In a further advantageous embodiment of the valve-actuating device, the fifth switching element is arranged between the seventh rocker arm part and the eighth rocker arm part.

In a further advantageous embodiment of the valve-actuating device, the first camshaft or the second camshaft is configured in the region of the valve control motion being tapped by the seventh rocker arm part such that the opening points of the second valve correspond to that of an intake valve in Miller cycle, particularly as Miller cam.

In a further advantageous embodiment of the valve-actuating device, the first switching element, third switching element, fourth switching element and/or fifth switching element is/are configured and/or arranged so as to realize respectively different deflection amplitudes, particularly valve lifts, of the second rocker arm part, fourth rocker arm part, sixth rocker arm part and/or eighth rocker arm part.

In a further advantageous embodiment of the valve-actuating device, the first rocker arm part, third rocker arm part, fifth rocker arm part and/or seventh rocker arm part are pretensioned relative the cylinder head against the first camshaft and/or second camshaft, particularly by a respective pretensioning element, particularly a retention spring. With this pretensioning, a limit stop of the respective rocker arm part, which moves on a cam, cannot raise from said cam. So doing ensures that the respective position corresponding to the cam profile will always be obtained, even when the respective switching elements are not activated.

In a further advantageous embodiment of the valve-actuating device, at least two of the elements of the first rocker arm part, second rocker arm part, third rocker arm part, fourth rocker arm part, fifth rocker arm part, sixth rocker arm part, seventh rocker arm part and/or eighth rocker arm part are pivotable about a common rocker arm shaft. Providing a common rocker arm shaft for different rocker arm parts affords the most effective rotational transmission of a switching valve motion for cooperating rocker arm parts.

In a further advantageous embodiment of the valve-actuating device, the first switching element and/or the fourth switching element comprise a limiting element which limits the maximum switching position. Limiting the maximum switching position can ensure that relatively small valve lifting motions cannot be transmitted from the first or second camshaft to the second or fourth rocker arm part despite the first switching element and/or fourth switching element being activated.

In a further advantageous embodiment of the valve-actuating device, the control pulses are fed to the respective switching element by a control fluid, particularly a lubricant, via switching valves, particularly 4/2-way solenoid valves, which have a first connection A and a second connection B for control lines, a pressure connection for supplying the control fluid, and a return flow connection for pressure relief, wherein the two A and B connections are in each case connectable to the pressure connection and the return flow connection in two switching positions. Employing 4/2-way solenoid valves ensures hydraulic actuation of the respective switching elements at minimum response time and high operational reliability.

In a further advantageous embodiment of the valve-actuating device, the two first valves are operatively connected to the valve bridge by first joints.

In a further advantageous embodiment of the valve-actuating device, the first stop and/or the second stop comprises a respective second joint.

In a further advantageous embodiment of the valve-actuating device, the first rocker arm part and the second rocker arm part are integrally formed.

The above-described aspects of the invention and the associated features disclosed for further developing the valve-actuating device also apply correspondingly to the internal combustion engine, the method of valve control and the method of valve actuation and vice versa. Particularly the features of the valve-actuating device according to claims 1 to 44 can be combined with those of the valve-actuating device according to claims 45 to 49 and vice versa.

In one advantageous embodiment of the internal combustion engine, at least one inlet for transmitting control pulses to the first switching element, the second switching element, the third switching element, the fourth switching element and/or the fifth switching element and/or a lubricant line extends through the rocker arm shaft. No separate inlet to the switching elements, e.g. via flexible tubes, is thus mandatory.

In a further advantageous embodiment of the internal combustion engine, the control fluid for controlling at least the first switching element is lubricant and the internal combustion engine has an additional oil pump on the at least one inlet to apply the necessary pressure for the operation of at least the first switching element upon the internal combustion engine being started and/or prevent the lubricant from draining out of the at least one inlet of the internal combustion engine even without a check valve being provided in the feed to the switching element(s).

In a further advantageous embodiment, the internal combustion engine has at least six engine cylinders, each comprising a first switching element, a second switching element, a third switching element and a fourth switching element and at least six switching valves, wherein in the case of the sixth switching valve, a connection A is connected to the respective first switching element of the fifth engine cylinder and/or sixth engine cylinder, a connection B is connected to the third switching element of the fifth engine cylinder and/or sixth engine cylinder, and a connection P is connected to a connection B of the fifth switching valve, wherein in the case of the fifth switching valve, a connection A or B is connected to the respective fourth switching element of the fourth engine cylinder, fifth engine cylinder and/or sixth engine cylinder, wherein in the case of the fourth switching valve, a connection A is connected to the first switching element of the fourth engine cylinder, a connection B is connected to the third switching element of the fourth engine cylinder, and a pressure connection is connected to a connection B of the fifth switching valve, wherein in the case of the third switching valve, a connection A is connected to the first switching element of the third engine cylinder and a connection B is connected to the third switching element of the third engine cylinder, wherein in the case of the second switching valve, a connection A is connected to the first switching element of the second engine cylinder and a connection B is connected to the third switching element of the second engine cylinder, and wherein in the case of the first switching valve, a connection A is connected to the first switching element of the first engine cylinder, a connection B is connected to the third switching element of the first engine cylinder, and a pressure connection is connected to the respective fourth switching element of the first engine cylinder, second engine cylinder and/or third engine cylinder. This interconnecting of the switching valves with the respective switching elements enables three different engine operating modes to be realized with only six switching valves, namely normal engine operation, engine braking mode and partial engine cylinder cut-off, whereby 5 stages of braking power can be regulated (weak to strong).

In a further advantageous embodiment, the internal combustion engine has at least six engine cylinders, each comprising a first switching element, a second switching element, a third switching element, a fourth switching element and a fifth switching element and at least six switching valves, wherein in the case of the sixth switching valve, a connection A is connected to a respective fifth switching element of the fourth engine cylinder, fifth engine cylinder and/or sixth engine cylinder, a connection B is connected to the fourth switching element of the fourth engine cylinder, fifth engine cylinder and/or sixth engine cylinder, and a pressure connection is connected to a connection A or B of a fifth switching valve, wherein in the case of the fourth switching valve, a connection A is connected to the respective first switching element of the fourth engine cylinder, fifth engine cylinder and/or sixth engine cylinder, a connection B is connected to the third switching element of the fourth engine cylinder, fifth engine cylinder and/or sixth engine cylinder, and a pressure connection is connected to a connection A or B of the fifth switching valve, wherein in the case of the third switching valve, a connection A is connected to the first switching element of the third engine cylinder and a connection A or B is connected to the third switching element of the third engine cylinder, and wherein in the case of the second switching valve, a connection A is connected to the respective fifth switching element of the first engine cylinder, second engine cylinder and/or third engine cylinder, a connection B is connected to the fourth switching element of the first engine cylinder, second engine cylinder and/or third engine cylinder, and wherein in the case of the first switching valve, a connection A is connected to the respective first switching element of the first engine cylinder and/or second engine cylinder and a connection B is connected to the third switching element of the first engine cylinder and/or second engine cylinder. This interconnecting of the switching valves with the respective switching elements enables four different engine operating modes to be realized with only six switching valves, namely normal engine operation, engine braking mode, partial engine cylinder cut-off and Miller cycle mode, whereby 5 stages of braking power can be regulated (weak to strong).

In a further advantageous embodiment, the internal combustion engine has at least six engine cylinders, each comprising a first switching element, a second switching element, a third switching element, a fourth switching element and a fifth switching element and at least six switching valves, wherein in the case of the sixth switching valve, a connection A is connected to the respective fifth switching element of the fourth engine cylinder, fifth engine cylinder and/or sixth engine cylinder, a connection B is connected to the fourth switching element of the fourth engine cylinder, fifth engine cylinder and/or sixth engine cylinder, and a pressure connection is connected to a connection B of a fifth switching valve, wherein in the case of the fourth switching valve, a connection A is connected to the respective first switching element of the fourth engine cylinder, fifth engine cylinder and/or sixth engine cylinder, a connection B is connected to the third switching element of the fourth engine cylinder, fifth engine cylinder and/or sixth engine cylinder, and a pressure connection is connected to a connection A or B of a fifth switching valve, wherein in the case of the third switching valve, a connection A is connected to the respective second switching element of the first engine cylinder, second engine cylinder, third engine cylinder, fourth engine cylinder, fifth engine cylinder and/or sixth engine cylinder, wherein in the case of the second switching valve, a connection A is connected to the respective fifth switching element of the first engine cylinder, second engine cylinder and/or third engine cylinder, and a connection B is connected to the fourth switching element of the first engine cylinder, second engine cylinder and/or third engine cylinder, and wherein in the case of the first switching valve, a connection A is connected to the respective first switching element of the first engine cylinder, second engine cylinder and/or third engine cylinder, and a connection B is connected to the third switching element of the first engine cylinder, second engine cylinder and/or third engine cylinder. This interconnecting of the switching valves with the respective switching elements enables five engine operating modes of an internal combustion engine to be realized with only six switching valves, namely normal engine operation, engine braking mode, partial engine cylinder cut-off, Miller cycle mode and exhaust gas recirculation operation, whereby 5 stages of braking power can be regulated (weak to strong).

In a further advantageous embodiment of the internal combustion engine, the valve-actuating device further comprises a seventh switching valve, and the pressure connection of the second switching valve is additionally connected to a connection A or B of the seventh switching valve and/or the pressure connection of the first switching valve is additionally connected to a connection A or B of the seventh switching valve. Further developing the interconnecting as such with an additional seventh switching valve further enables variable engine cylinder cut-off, wherein with an even number of cylinders, half of the cylinders can in each case be switched off. Variable partial engine cylinder cut-off achieves being able to even out the number of operating hours for all the cylinders operating in the engine.

In a further advantageous embodiment of the invention, the first through the fourth and/or sixth switching valves are 4/2-way solenoid valves and the fifth and/or seventh switching valves are 2/2-way solenoid valves, 3/2-way solenoid valves and/or 4/2-way solenoid valves. Providing this valve configuration enables being able to realize the different operating modes with a lower number of valves. A further reduction in the number of valves would be possible by fewer stages of braking power being regulated.

In one advantageous embodiment, the valve control method according to the invention further comprises the following step: Closing a first check valve arrangement of the first switching element. Closing the first check valve arrangement ensures that the switching position of the first switching element is maintained even when the control pressure falls or when the force the control pressure effects in the first switching element is exceeded.

In a further advantageous embodiment of the inventive method, the valve-actuating device comprises a second switching element and the method further comprises the following step: Feeding the control pulse to the second switching element, particularly a second cylinder, whereby the switching position of the second switching element, a second piston in particular, depends on the pressure and the duration of the control fluid feed. The magnitude and/or length of the control pulse can thus produce a sustained switching position for the second switching element.

In a further advantageous embodiment of the inventive method, the control pulse is fed to the second switching element prior to the first switching element. Doing so can thus achieve one of the two first valves being opened prior to the other of the two first valves upon valve actuation in a reciprocating piston engine having two first valves.

In a further advantageous embodiment of the inventive method, the control fluid is fed to the second switching element and the first switching element simultaneously.

In a further advantageous embodiment of the inventive method, the valve-actuating device comprises at least two first valves and the method comprises the following further steps in a first operating mode, particularly the engine braking mode: Opening one of the first valves; and opening both first valves thereafter. first only opening one of the first valves opening achieves a valve opening process which is less taxing on the components. This is particularly of importance in engine braking operation when the two first valves, in most cases exhaust valves, are used in decompressing the pressurized gas in the cylinder at the end of the second or fourth stroke of a four-stroke internal combustion engine. Because of the high pressures in engine cylinders, opening both first valves simultaneously runs a high risk of damaging the components which transmit valve control motions to the two first valves, at least over time. This is due to the high force needed to overcome the resistance effected by the doubled valve area and the thereby doubled effective force of two valves. In contrast, opening one of the two first valves first already reduces the initially very high compressive load in the engine cylinder prior to the two first valves starting to open.

In a further advantageous embodiment of the inventive method, the valve-actuating device comprises at least two first valves and the method comprises the following further steps in a second operating mode, particularly engine operation: Simultaneously actuating both first valves. It is essential in normal engine operation, in contrast to engine braking operation, for the two first valves, particularly exhaust valves, to be able to exhaust or blow off burned gases as quickly as possible. The valves are opened in the process when the cylinder piston reaches the region of bottom dead center; the spent gases thus in uncompressed state. The force on the valve surfaces exerted by pressure in the engine cylinder is therefore substantially lower than in engine braking to mode.

In a further advantageous embodiment of the inventive method, the valve-actuating device further comprises a valve bridge connecting the at least two first valves together, wherein a first limit stop of the second rocker arm part is substantially arranged above one of the two first valves and/or a second limit stop of the fourth rocker arm part is substantially arranged centrically on the valve bridge, and the method comprises the following further step: Pushing off a second rocker arm part from the valve bridge by means of the second switching element above the first stop such that the second stop is distanced from the valve bridge. Distancing the second stop from the valve bridge achieves, upon the first and second switching element being activated, first effecting a valve control motion, or a pivoting respectively of the second rocker arm part on the one of the two first valves above which the first stop is arranged, with the other of the two first valves not opening until a further pivoting of the second rocker arm part.

In a further advantageous embodiment of the inventive method, the valve-actuating device further comprises a third rocker arm part, a fourth rocker arm part and a third switching element, wherein the method comprises the following further step: Tapping a second motion on the camshaft via the third rocker arm part; selectively feeding the control pulse to the third switching element, particularly a third cylinder, to control the valve lift, wherein the position of the third switching element, particularly a third piston, depends on the magnitude and/or length of the control pulse, particularly the pressure and duration of the control fluid feed; the fourth arm part transmitting the second motion to a first valve as a function of the position of the third switching element.

In a further advantageous embodiment of the inventive method, the valve-actuating device further comprises a fifth rocker arm part, a sixth rocker arm part and a fourth switching element.

The method comprises the following further step: Tapping a third motion on the camshaft via the fifth rocker arm part; selectively feeding the control pulse to the fourth switching element, particularly a fourth cylinder, to control the valve lift, wherein the position of the fourth switching element, particularly a fourth piston, depends on the magnitude and/or length of the control pulse; and the sixth rocker arm part transmitting the motion to the second valve as a function of the position of the fourth switching element.

In a further advantageous embodiment of the inventive method, a control pulse is fed exclusively to the first switching element, second switching element and/or fourth switching element in a braking operating mode.

In a further advantageous embodiment of the inventive method, the control pulse is fed exclusively to the third switching element and/or fourth switching element in a drive mode or in cylinder cut-off mode.

In a further advantageous embodiment of the inventive method, the control pulse is fed in an exhaust gas recirculation operating mode exclusively to the second switching element, the third switching element and/or the fourth switching element.

In a further advantageous embodiment of the inventive method, the valve-actuating device further comprises a seventh rocker arm part, an eighth rocker arm part and a fifth switching element. The method comprises the following steps: Tapping a fourth motion on the camshaft via the seventh rocker arm part; selectively feeding the control pulse to the fifth switching element, particularly a fifth cylinder, to control the valve lift, wherein the position of the fifth switching element, particularly a first piston, depends on the magnitude and/or length of the control pulse; and the eighth rocker arm part transmitting the motion to the second valve as a function of the position of the fourth switching element.

In a further advantageous embodiment of the inventive method, the control pulse is fed exclusively to the third switching element and/or fifth switching element in a Miller cycle operating mode.

In a further advantageous embodiment, the inventive valve actuation method comprises the following further steps: Firstly closing the first valve (5; 5a, 5b) of the reciprocating piston engine in a first phase at an approximate 150° KW to 240° KW, preferentially an approximate 170° KW to 220° KW and particularly preferentially an approximate 180° KW to 210° KW; and secondly closing the first valve of the reciprocating piston engine in a second phase at an approximate 390° KW to 450° KW, preferentially an approximate 410° KW to 430° KW and particularly preferentially an approximate 420° KW.

In a further advantageous embodiment of the inventive method, the reciprocating piston engine comprises at least two first valves and the two first valves are actuated simultaneously.

In a further advantageous embodiment of the inventive method, the reciprocating piston engine comprises at least two first valves and the first opening step comprises the following sub-steps: Opening the one first valve; and thereafter, opening the other first valve. As already described above, consecutively actuating the two first valves can reduce the stress on the valve-actuating device components. Moreover, in the engine braking operating mode, actuating two valves achieves a doubled effective flow area compared to only actuating one valve.

In a further advantageous embodiment of the inventive method, one first valve is opened at an approximate 660° KW to 720° KW, preferentially an approximate 680° KW to 700° KW and particularly preferentially an approximate 690° KW and/or the other first valve (5a) is opened at an approximate 690° KW to 30° KW, preferentially an approximate 710° KW to 10° KW and particularly preferentially at 0° KW.

In a further advantageous embodiment of the inventive method, only the one first valve is actuated in the second opening step.

In a further advantageous embodiment of the inventive method, the first opening step comprises the following sub-steps: Closing the other first valve; and thereafter closing the one first valve.

In a further advantageous embodiment of the inventive method, the one first valve is closed at an approximate 180° KW to 240° KW, preferentially an approximate 200° KW to 220° KW and particularly preferentially at an approximate 210° KW and/or the other first valve is closed at an approximate 150° KW to 210° KW, preferentially an approximate 170° KW to 90° KW and particularly preferentially at an approximate 180° KW.

In a further advantageous embodiment, the inventive method comprises the following step in engine operation mode: Thirdly opening at least one first valve of the reciprocating piston engine at an approximate 120° KW to 180° KW, preferentially an approximate 140° KW to 160° KW and particularly preferentially at an approximate 150° KW.

In a further advantageous embodiment of the inventive method, the reciprocating piston engine comprises at least two first valves and the two first valves are actuated simultaneously.

The above advantages, features and possible applications of the present invention derive from the following description of the preferential embodiment based on the figures which depict the following:

Figure 17A:
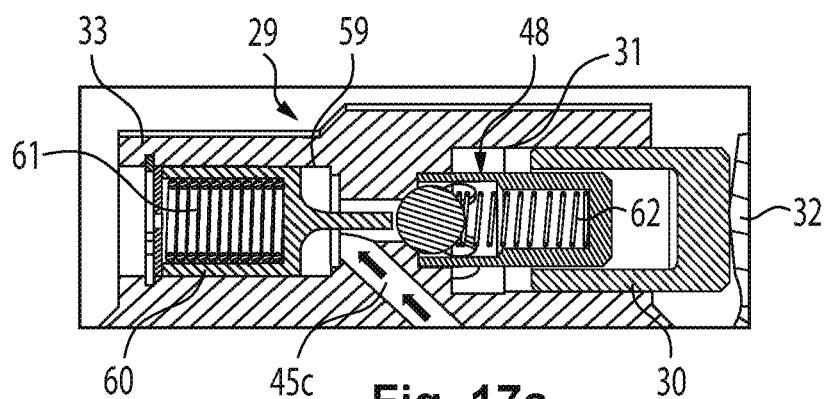

FIG. 17*a* shows a third switching element during engine operation in a partly schematic view.

Figure 17B:
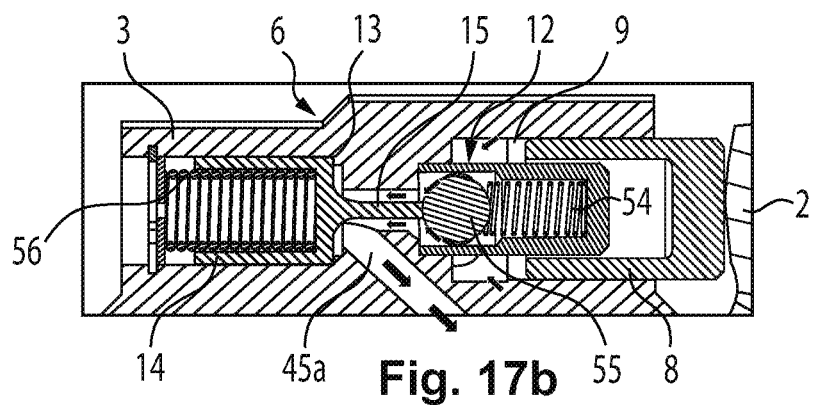

FIG. 17*b* shows a first switching element during engine operation in a partly schematic view.

Figure 18A:
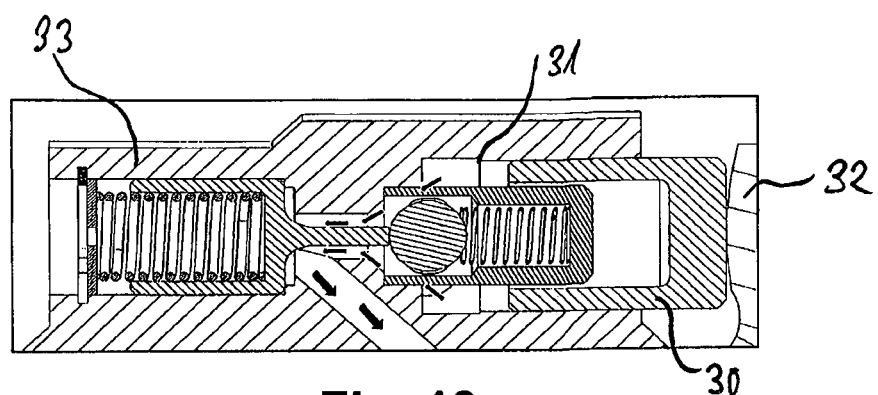

FIG. 18*a* shows a third switching element during engine braking operation in a partly schematic view.

Figure 18B:
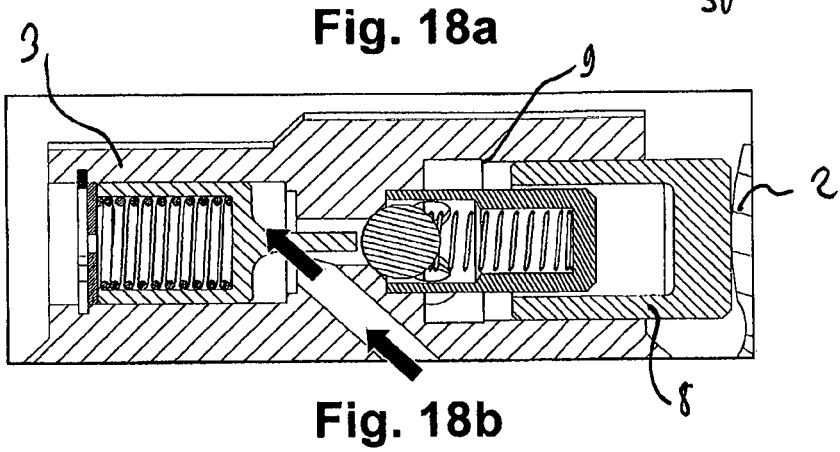

FIG. 18*b* shows a first switching element during engine braking operation in a partly schematic view.

Figure 19:
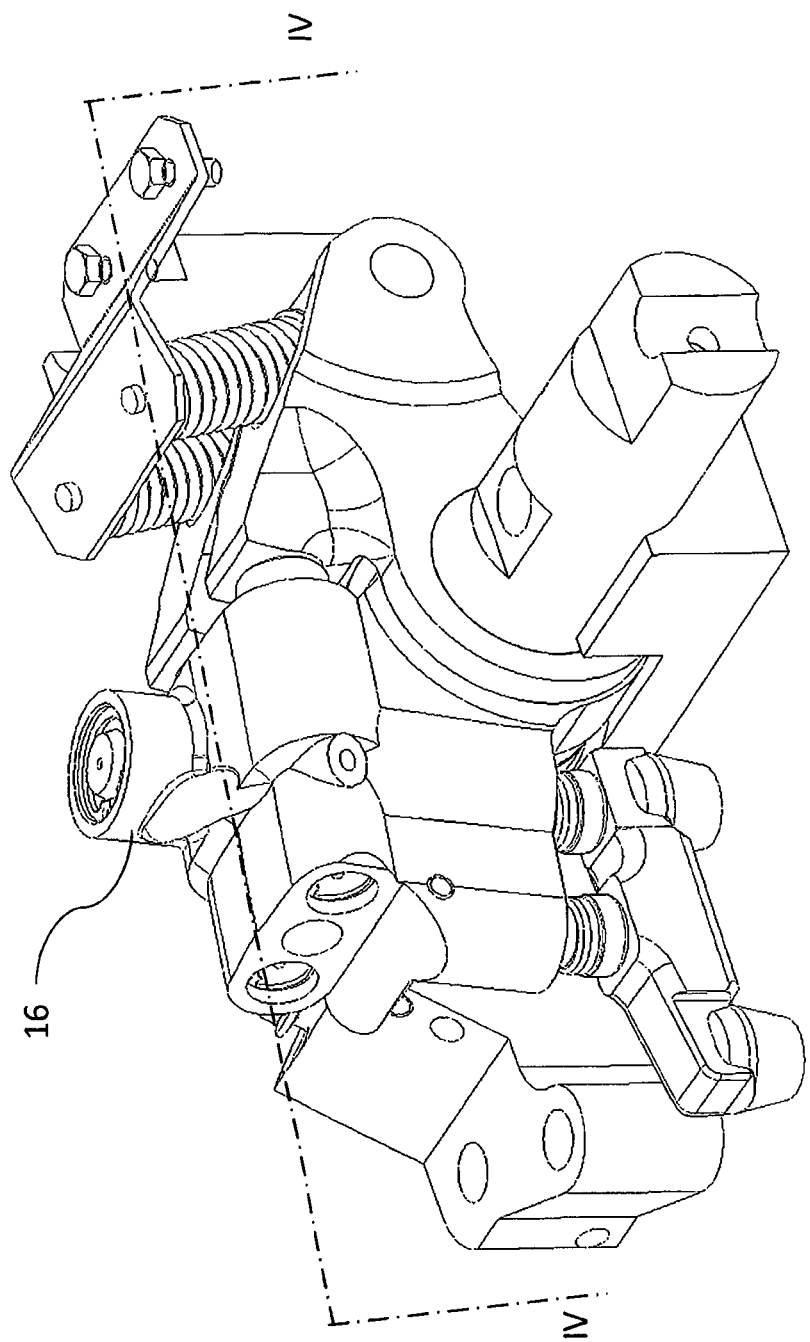

FIG. 19 shows a partly schematic view of an inventive valve-actuating device according to a second embodiment of the invention.

Figure 20:
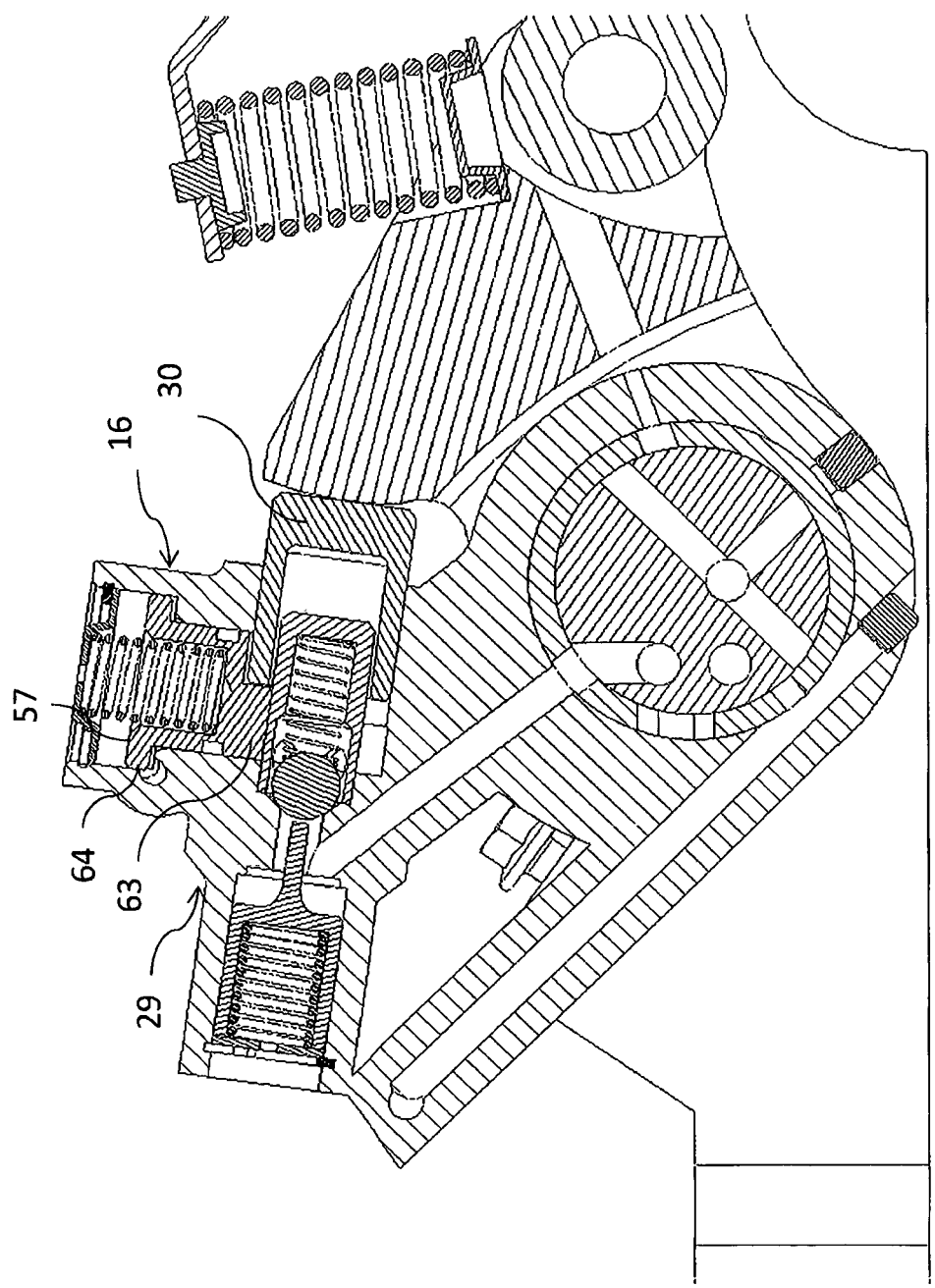

FIG. 20 shows a partly schematic cross section through the valve-actuating device according to the second embodiment from FIG. 20 along sectional plane IV-IV.

Figure 21:
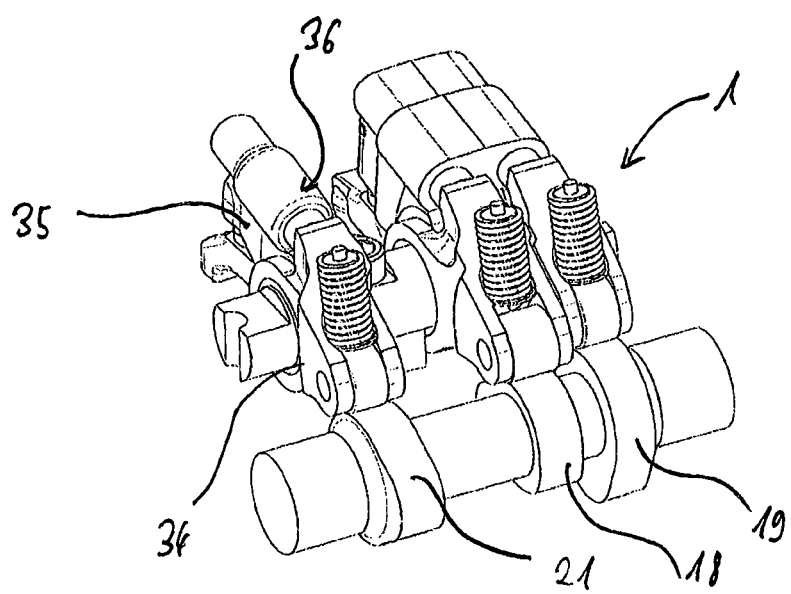

FIG. 21 shows a partly schematic perspective plan view of an inventive valve-actuating device according to a third embodiment of the invention.

Figure 22:
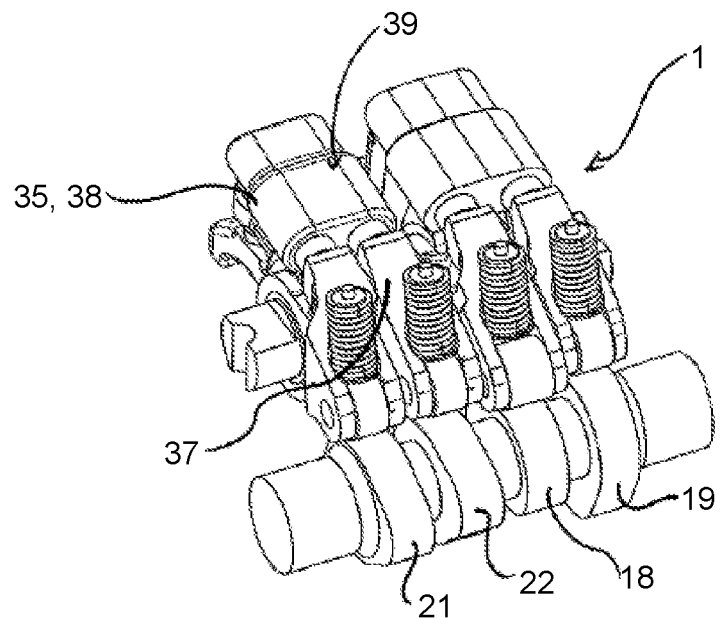

FIG. 22 shows a partly schematic perspective plan view of an inventive valve-actuating device according to a fourth embodiment of the invention.

Figure 23:
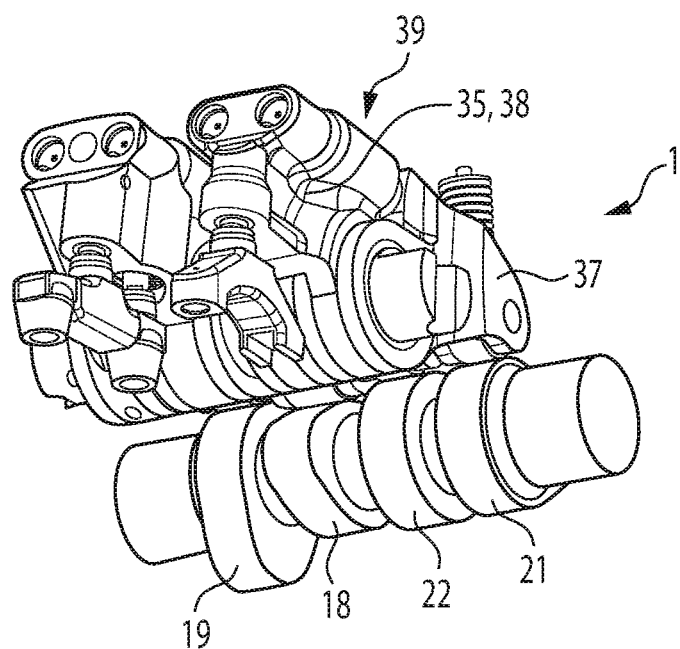

FIG. 23 shows a partly schematic perspective plan view of a valve-actuating device according to the fourth embodiment from FIG. 22 from the opposite direction.

Figure 24:
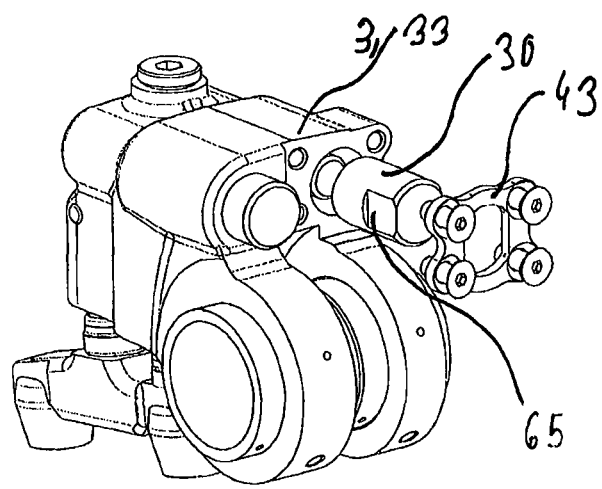

FIG. 24 shows a partly schematic, partially exploded view of an inventive valve-actuating device according to a fifth embodiment.

Figure 25:
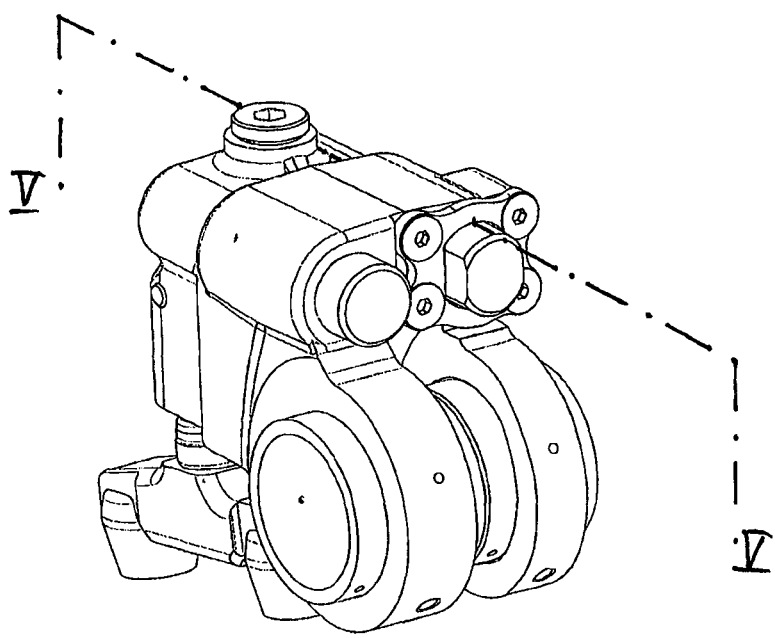

FIG. 25 shows a valve-actuating device according to the fifth embodiment from FIG. 24 in a partly schematic perspective plan view.

Figure 26:
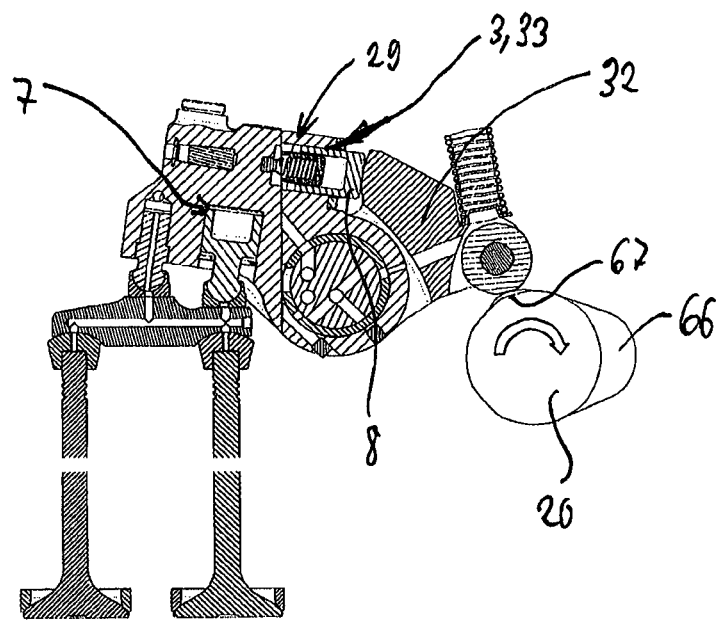

FIG. 26 shows a partly schematic cross section through a valve-actuating device according to the fifth embodiment from FIG. 25 along sectional plane V-V with small cam lobe detection deactivated.

Figure 27:
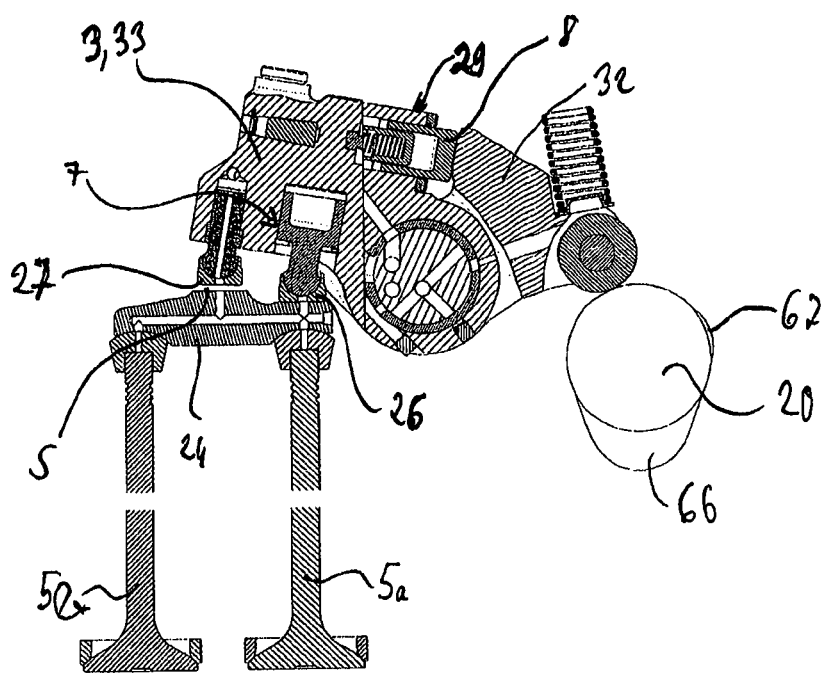

FIG. 27 shows a partly schematic cross section through a valve-actuating device according to the fifth embodiment from FIG. 25 along sectional plane V-V with small cam lobe detection activated.

Figure 28:
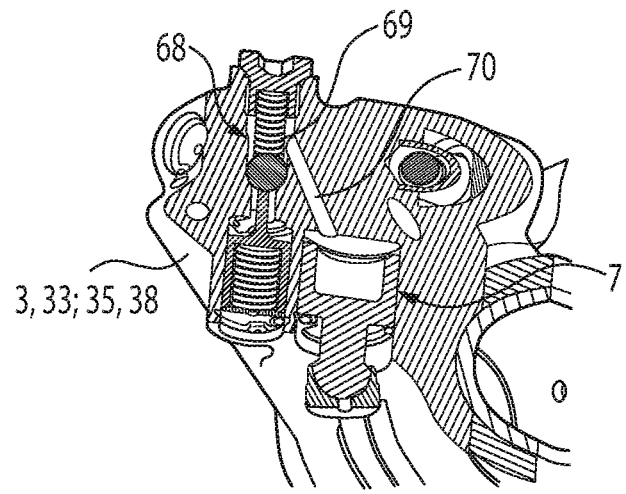

FIG. 28 shows a partly schematic cross section through a valve-actuating device according to the fifth embodiment from FIG. 25 along a sectional plane in which lies the axis of the second switching element or the sixth switching element and the second check valve arrangement.

Figure 29:
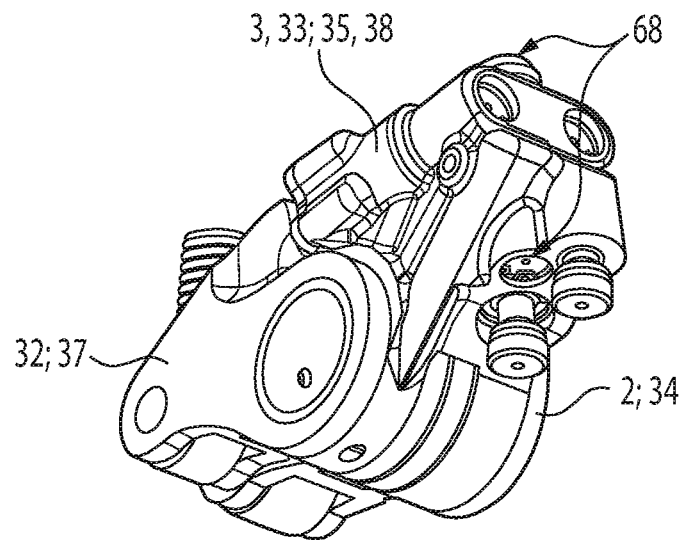

FIG. 29 shows a partly schematic perspective plan view of a valve-actuating device according to the fifth embodiment from FIG. 25.

Figure 30:
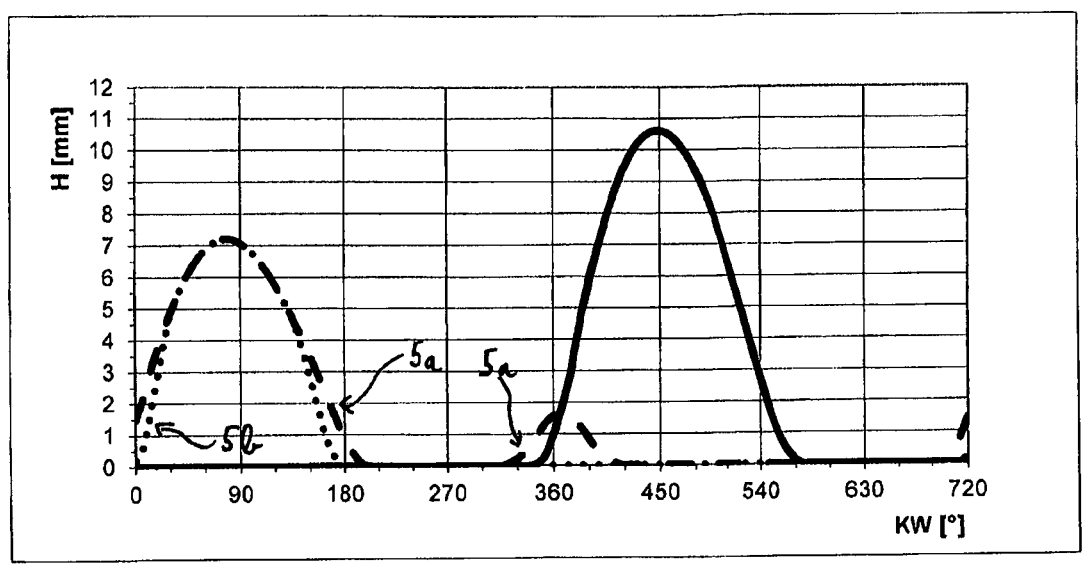

FIG. 30 shows a partly schematic representation of valve lift curves of an internal combustion engine in two-phase decompression engine braking mode according to the invention.

Figure 31:
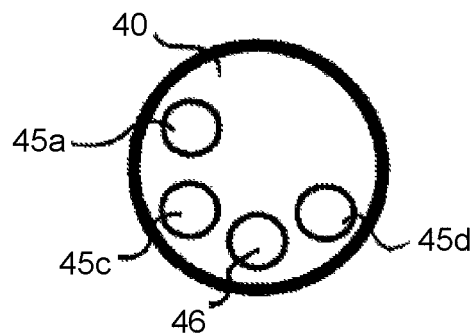

FIG. 31 shows a partly schematic cross section through a rocker am shaft in which inlets for three operating modes of the valve train, particularly engine operation, engine braking operation and cylinder deactivation, as well as a lubrication line are accommodated.

Figure 32:
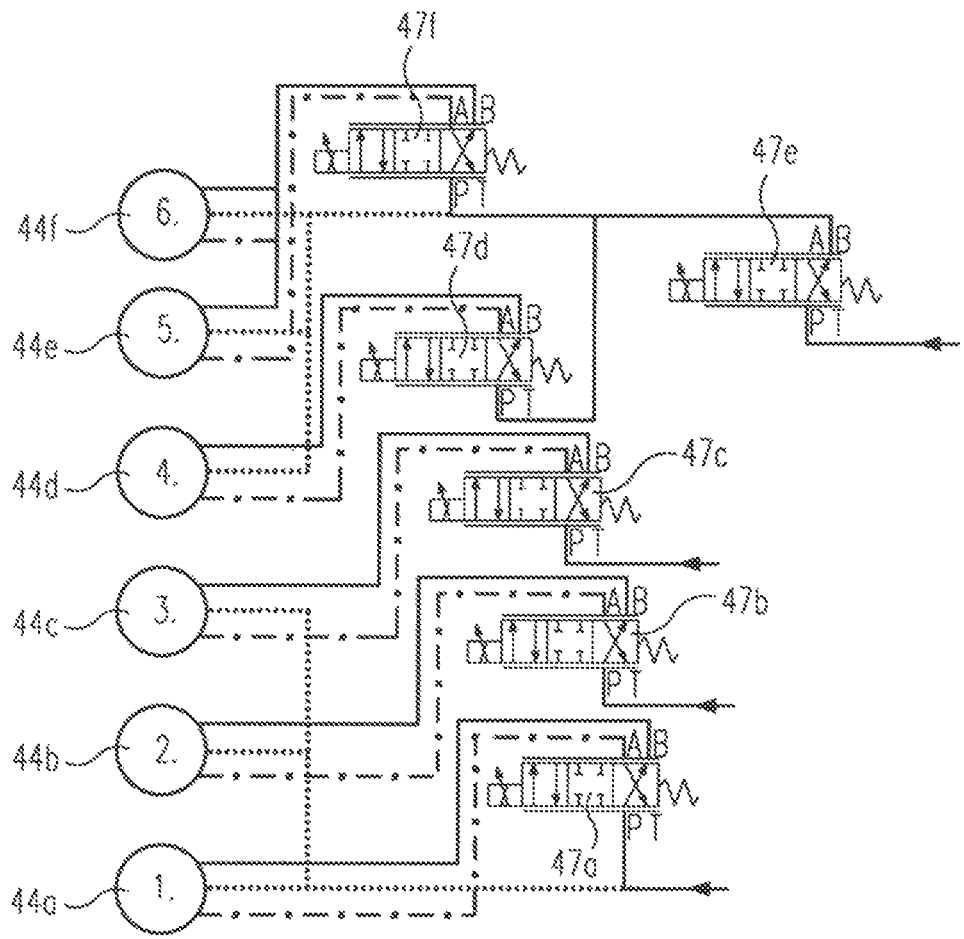

FIG. 32 shows a partly schematic hydraulic circuit diagram of an internal combustion engine comprising an inventive valve-actuating device having three valve train operating modes, particularly engine operation, engine braking operation and cylinder deactivation.

Figure 33:
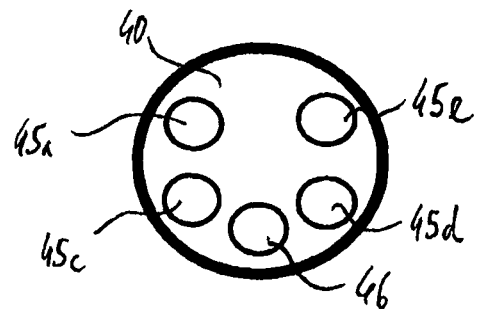

FIG. 33 shows a partly schematic cross section through a rocker am shaft having inlets for four operating modes of the valve train, particularly engine operation, engine braking operation, cylinder deactivation and Miller cycle operation.

Figure 34:
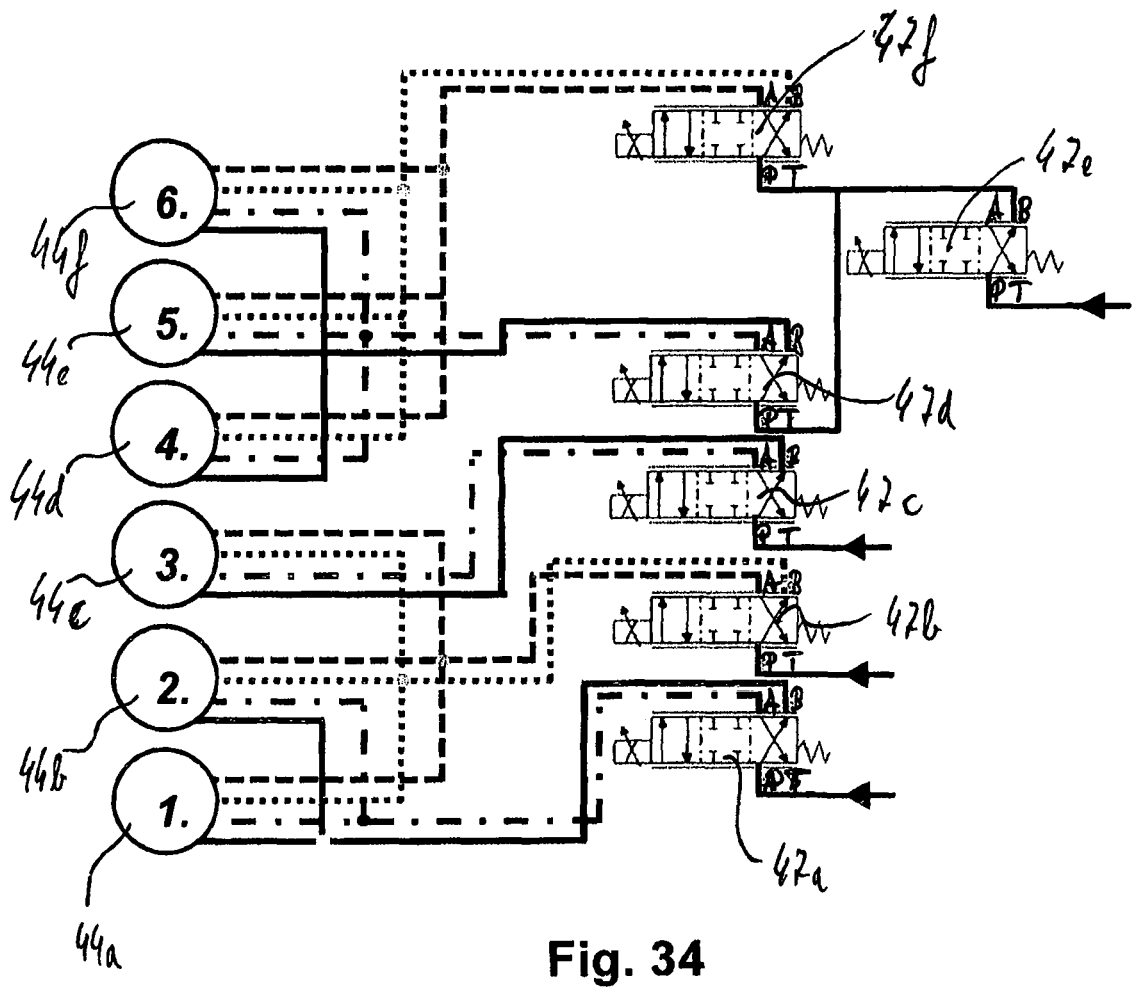

FIG. 34 shows a partly schematic hydraulic circuit diagram of an internal combustion engine comprising an inventive valve-actuating device having four valve train operating modes, particularly engine operation, engine braking operation, cylinder deactivation and Miller cycle operation.

Figure 35:
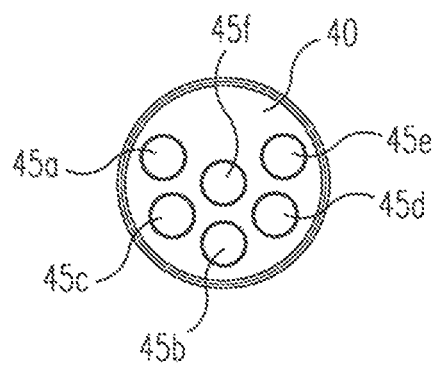

FIG. 35 shows a partly schematic cross section through a rocker am shaft having inlets for five operating modes of the valve train, particularly engine operation, engine braking operation, cylinder deactivation, Miller cycle operation and exhaust gas recirculation operation, as well as a lubrication line.

Figure 36:
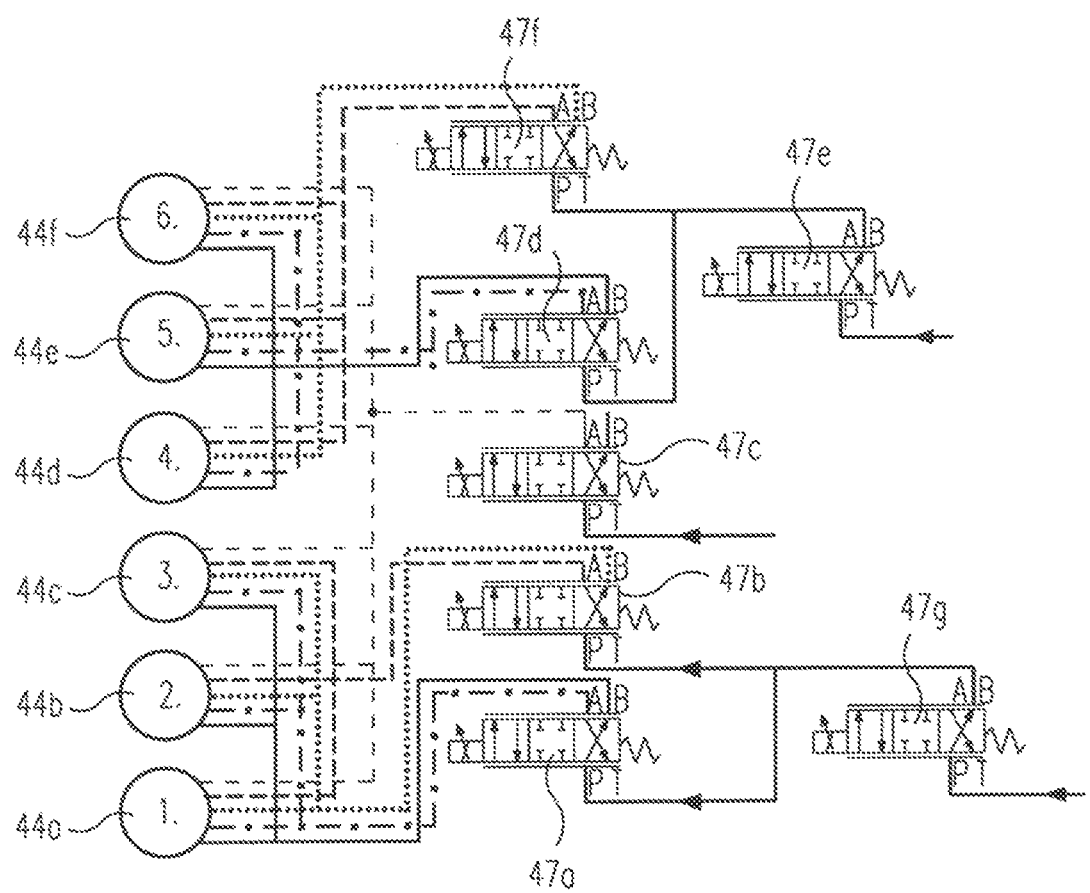

FIG. 36 shows a partly schematic hydraulic circuit diagram of an internal combustion engine comprising an inventive valve-actuating device having five valve train operating modes, particularly engine operation, engine braking operation, cylinder deactivation, Miller cycle operation and exhaust gas recirculation operation.

Figure 8:
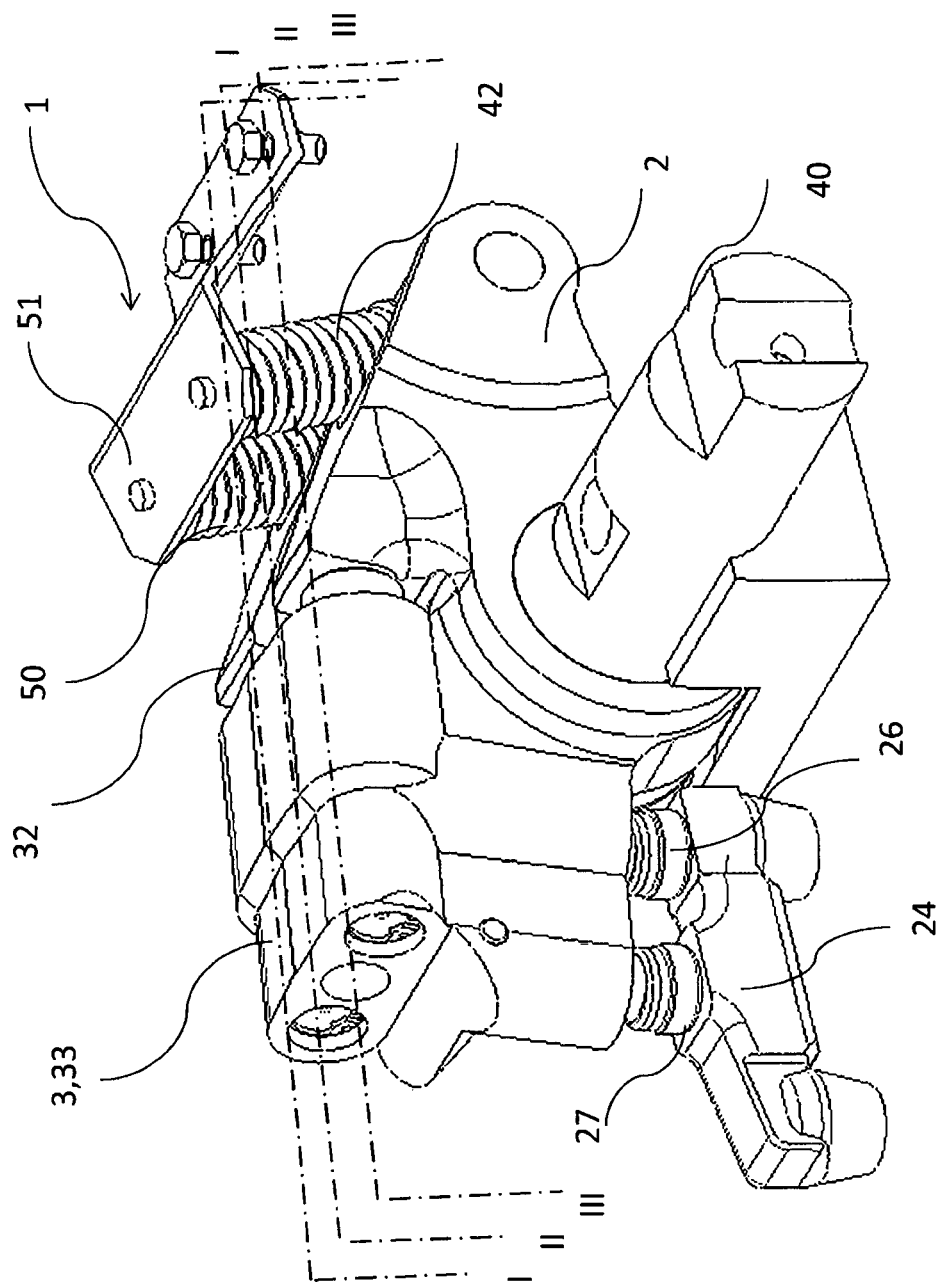
FIG. 8 shows a partly schematic perspective plan view of a first embodiment of the inventive valve-actuating device.
Figure 37:
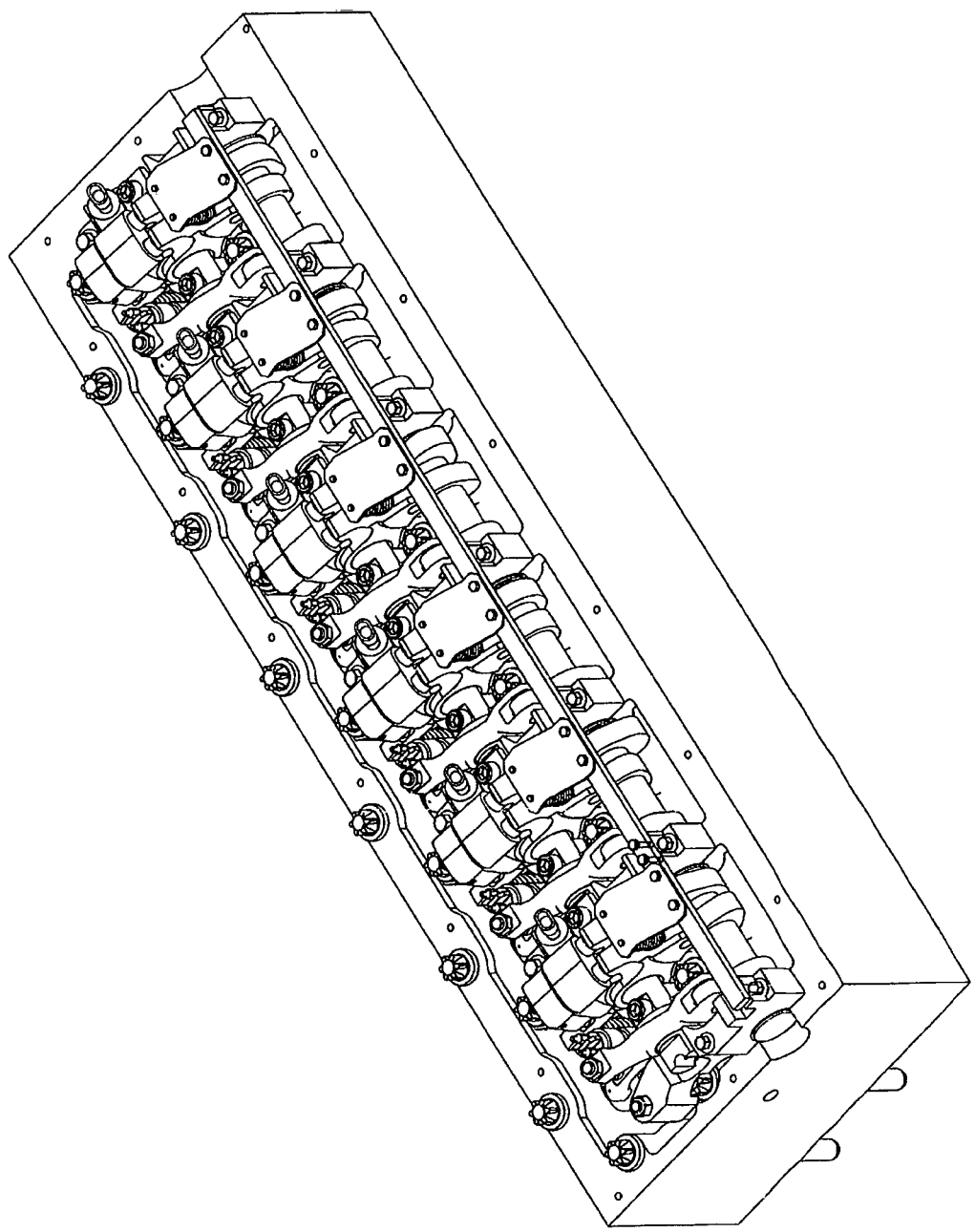

FIG. 37 shows a partly schematic plan view of the cylinder heads of an internal combustion engine comprising a valve-actuating device in accordance with the first embodiment of the invention from FIG. 8.

Figure 38:
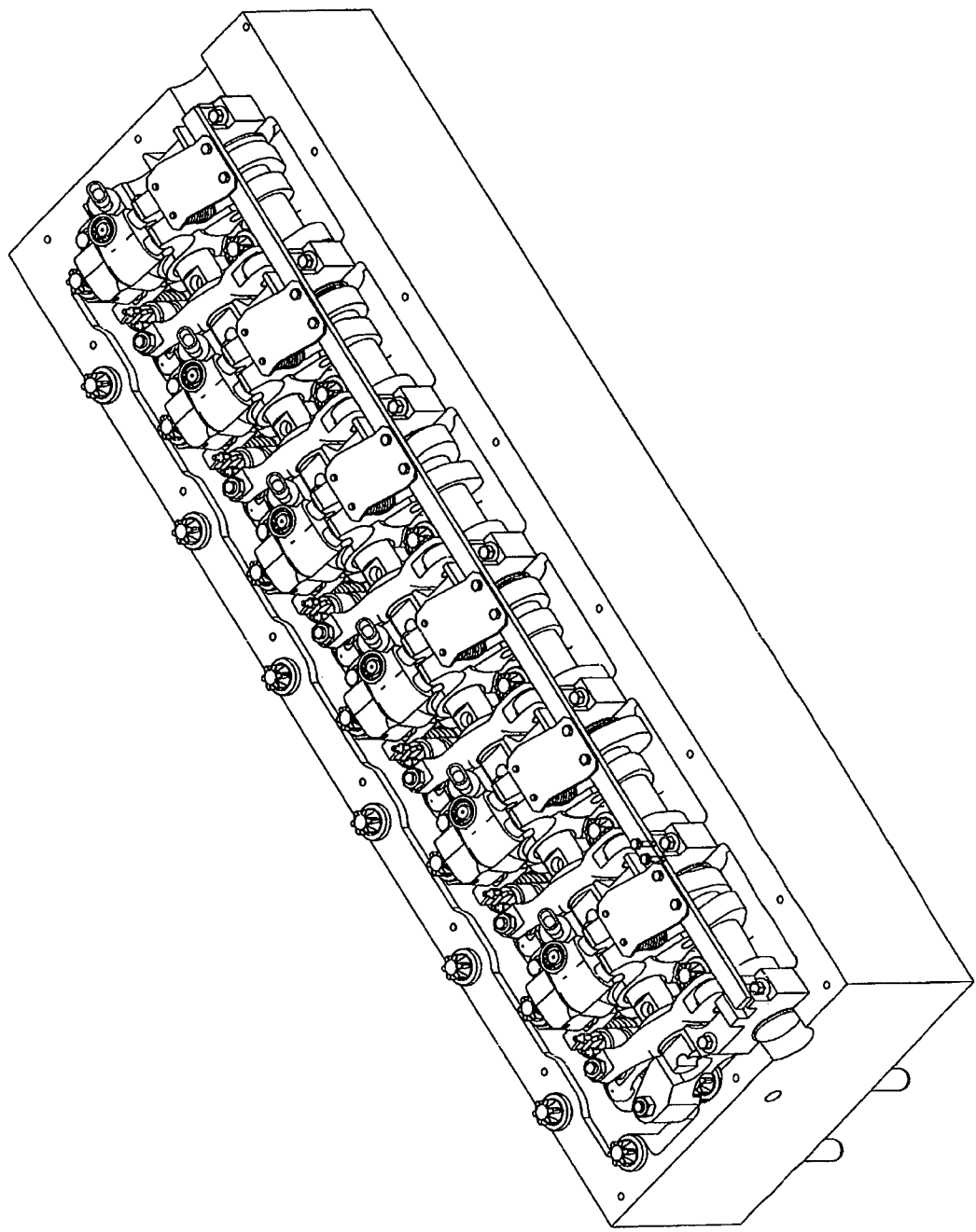

FIG. 38 shows a partly schematic perspective plan view of the cylinder heads of an internal combustion engine comprising an inventive valve-actuating device according to a second embodiment of the invention from FIG. 19.

Figure 39:
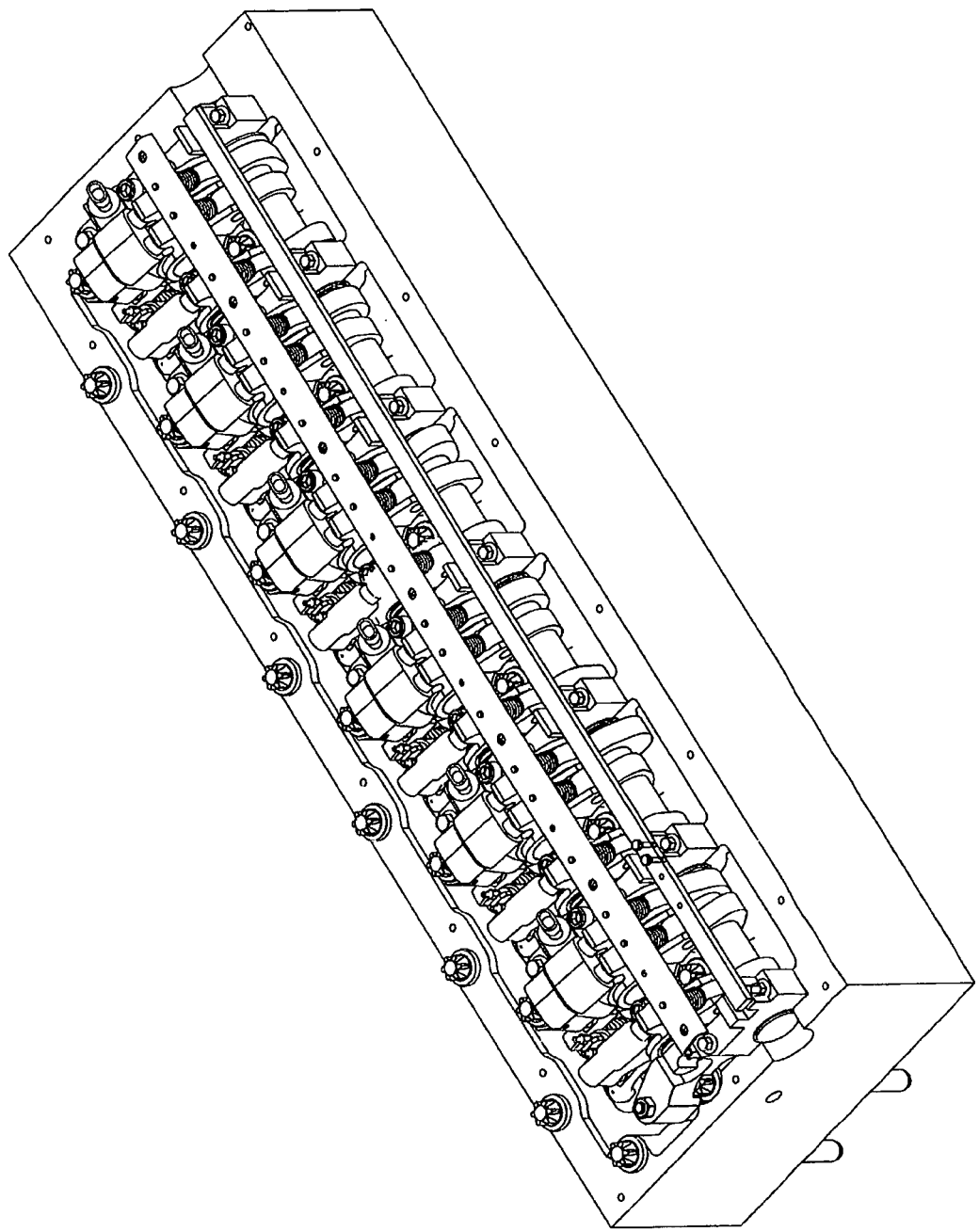

FIG. 39 shows a partly schematic perspective plan view of the cylinder heads of an internal combustion engine comprising an inventive valve-actuating device according to the third embodiment of the invention from FIG. 21.

Figure 40:
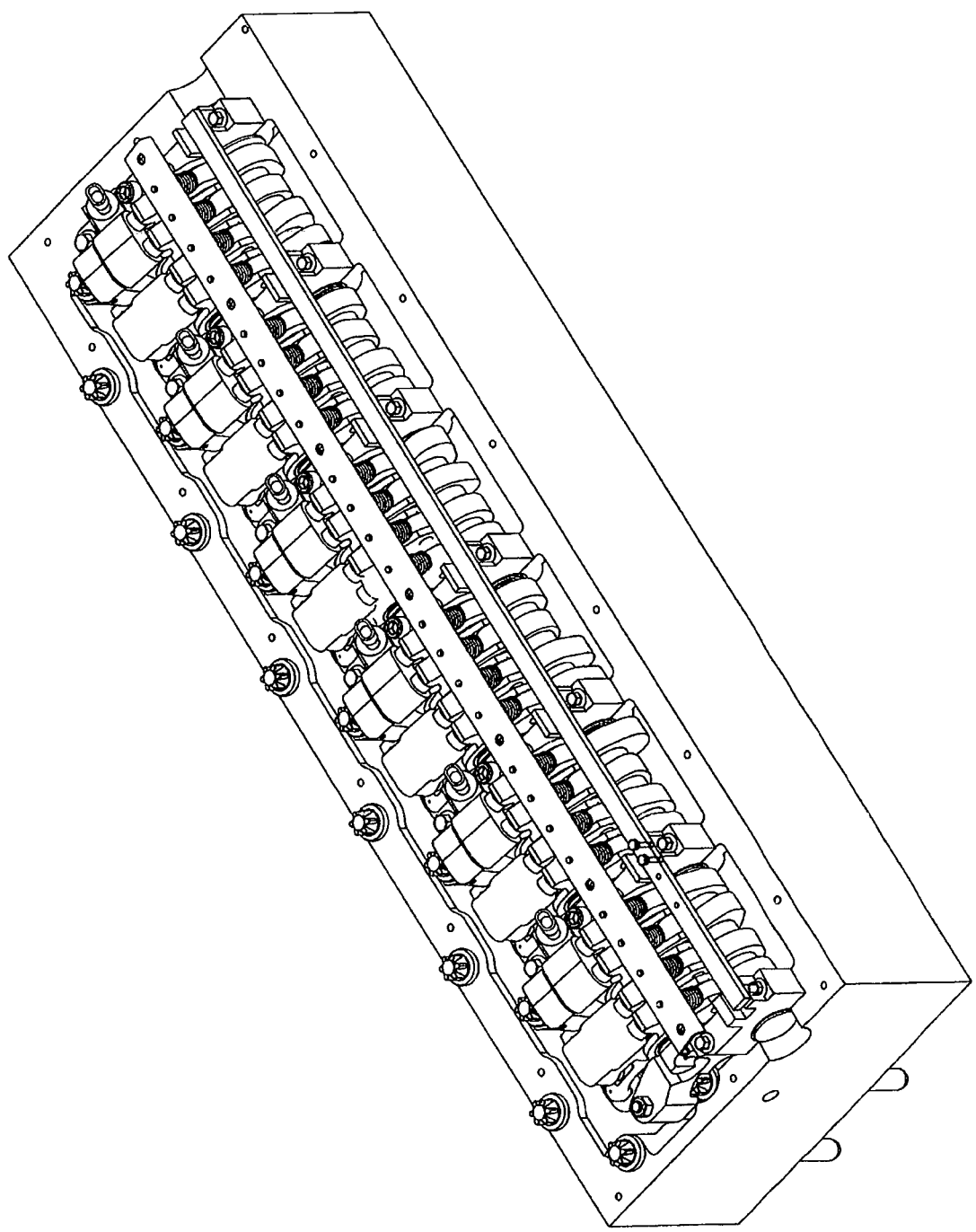

FIG. 40 shows a partly schematic perspective plan view of the cylinder heads of an internal combustion engine comprising an inventive valve-actuating device according to the fourth embodiment of the invention from FIG. 22.

Figure 41:
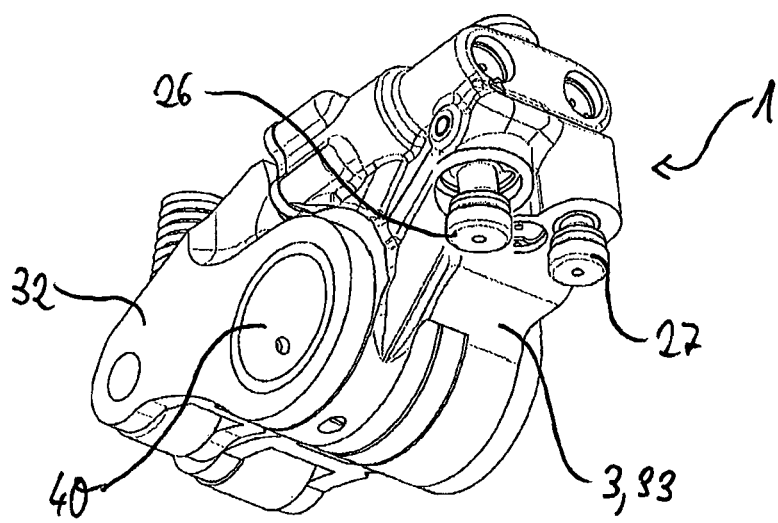

FIG. 41 shows a partly schematic perspective plan view of an inventive valve-actuating device according to one of the embodiments of the invention for engines comprising two overhead camshafts per cylinder bank.

Figure 42:
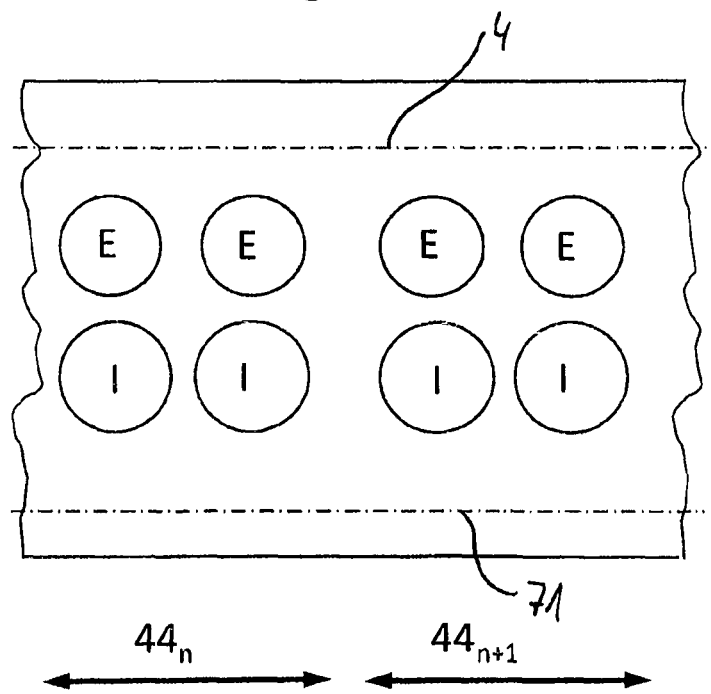

FIG. 42 shows a partly schematic view of a first embodiment for arranging the intake and exhaust valves in an inventive internal combustion engine comprising two overhead camshafts per cylinder bank.

Figure 43:
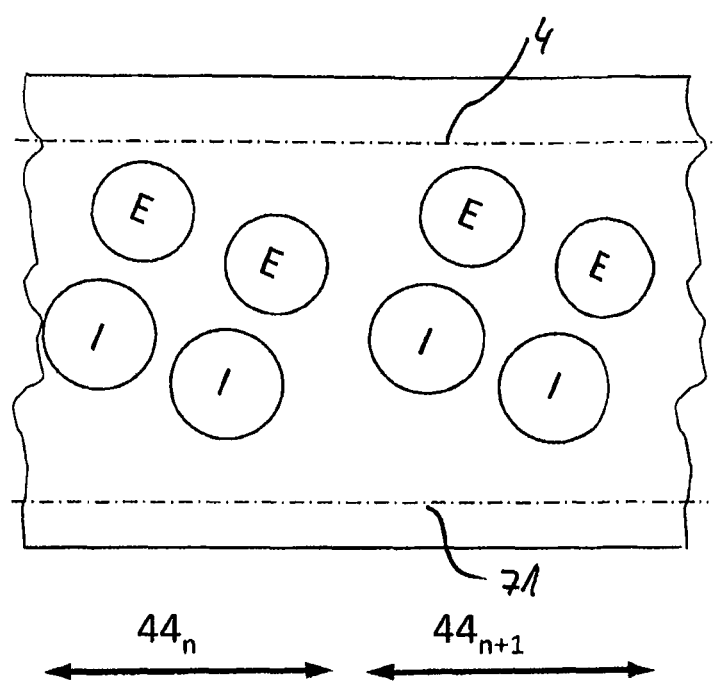

FIG. 43 shows a partly schematic view of a second embodiment for arranging intake and exhaust valves in an inventive internal combustion engine comprising two overhead camshafts per cylinder bank.

Figure 44:
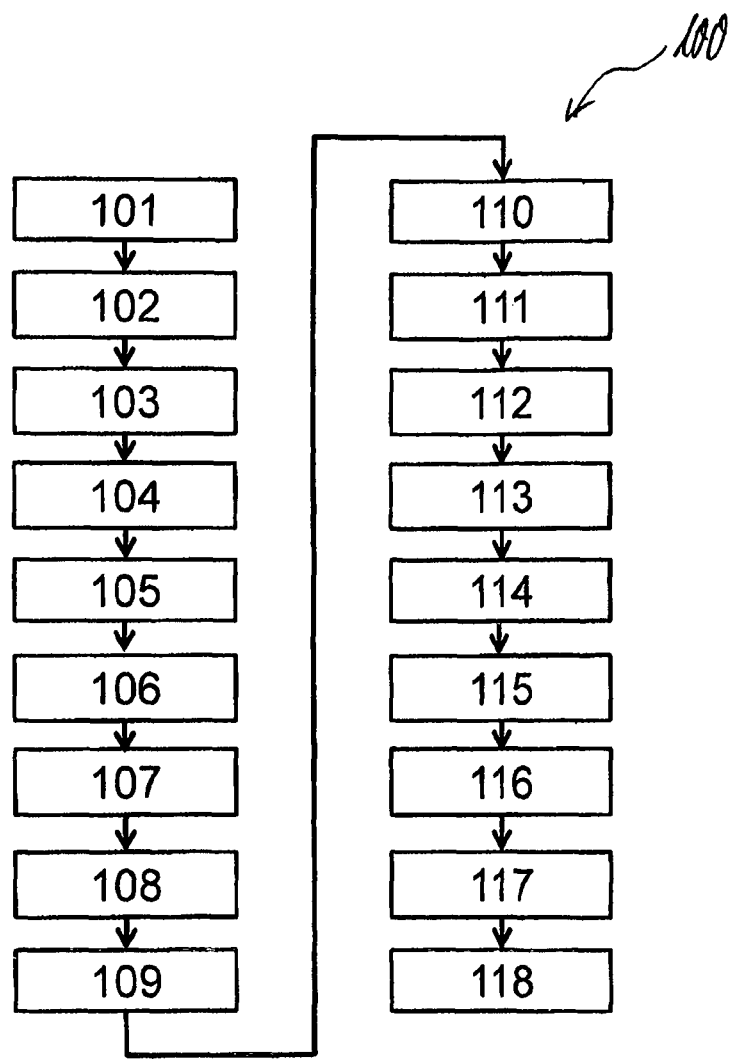

FIG. 44 shows a block diagram of a valve control method according to the invention.

Figure 45:
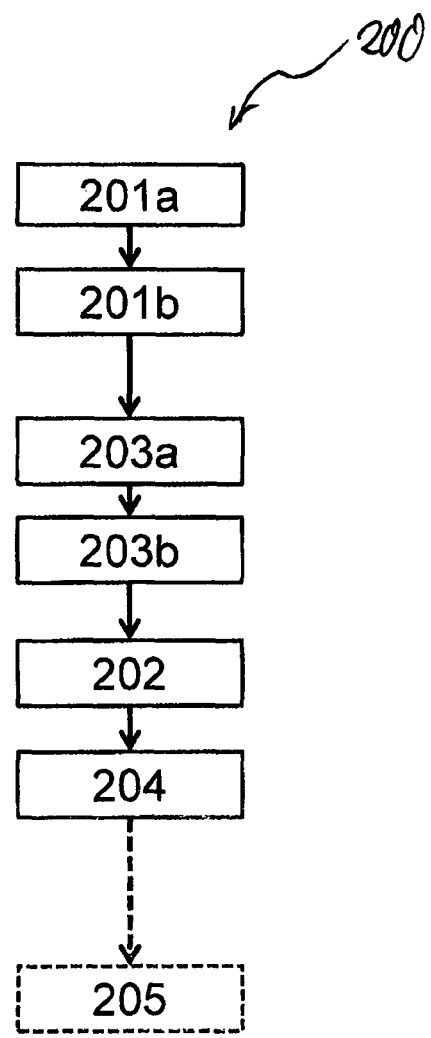

FIG. 45 shows a block diagram of a valve actuation method according to the invention.

The invention will be described in the following particularly on the basis of its application for the engine braking mode of an internal combustion engine, wherein, purely as an example, the at least one first valve $5a$, $5b$ is also referred to as exhaust valve E. However, the engine braking mode as described is but one of many example cases of application of the invention and does not limit the invention to just this one. The at least one first valve $5a$, $5b$ can also be another valve of the engine, in particular also at least one exhaust valve. The invention is also particularly applicable in general to reciprocating piston engines.

Figure 1:
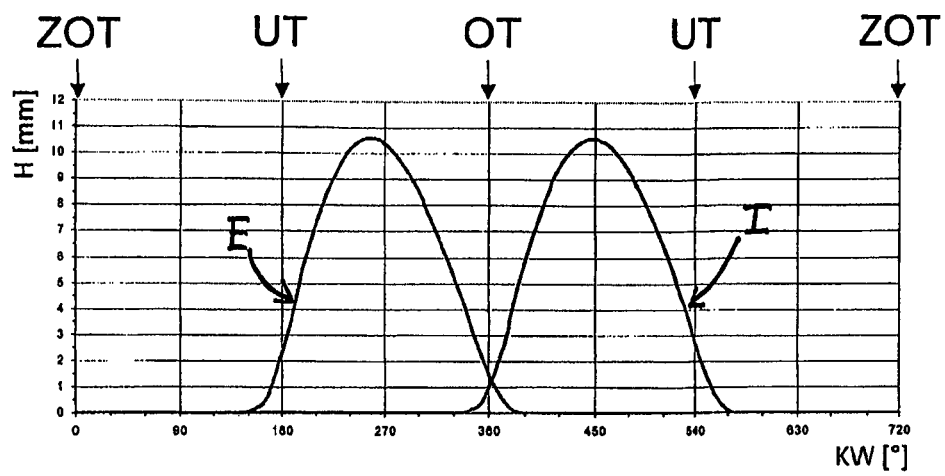
FIG. 1 shows a partly schematic representation of valve lift curves of an internal combustion engine in engine operation mode.

FIG. 1 shows valve lift curves of an internal combustion engine in normal engine operation; i.e. in burner operation. Valve lift curve E hereby stands for the exhaust valve, valve lift curve I for the intake valve, whereby the valve lift H in each case is plotted over the crankshaft angle KW. The invention defines the first stroke of the internal combustion engine as from the top dead center at ignition ZOT (0° KW) to bottom dead center of the engine piston UT (180° KW). The second stroke of the internal combustion engine is defined from bottom dead center UT (180° KM to top dead center in the load cycle (360° KM. The third stroke of the internal combustion engine is then defined from the top dead center in the load cycle (360° KW) to the following bottom dead center UT (540° KM. The fourth stroke of the internal combustion engine is defined from the latter bottom dead center UT (540° KW) to the top dead center again at ignition ZOT (720° KW=0° KW).

Figure 2:
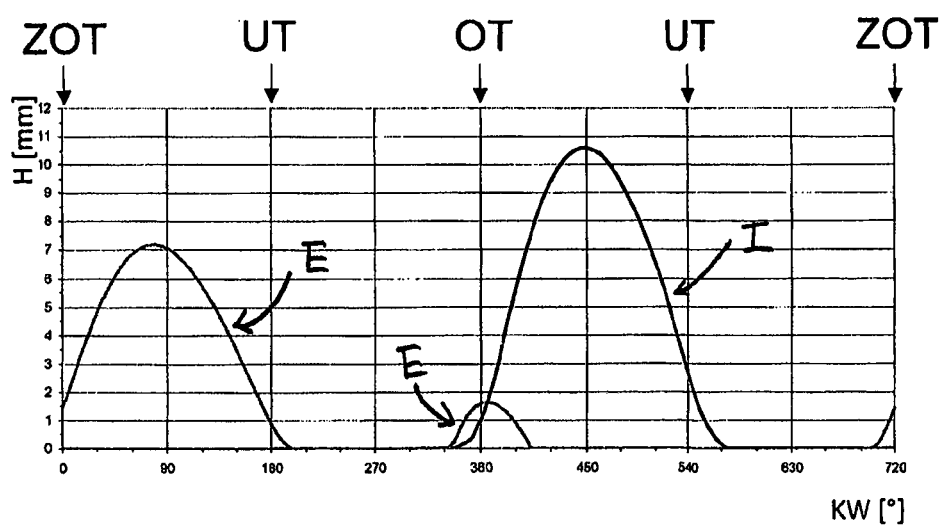
FIG. 2 shows a partly schematic representation of valve lift curves of an internal combustion engine in two-phase decompression engine braking mode according to the invention.

FIG. 2 depicts shifted valve lift curves of exhaust valve E relative to the engine operation mode in two-phase decompression engine braking mode. This two-phase decompression engine braking mode is characterized by the exhaust valve E being opened briefly prior to reaching the ZOT in the fourth stroke and prior to reaching the OT in the second stroke, whereby there is naturally no ignition in this operating mode. By the exhaust valve opening at these times, the compressed gas in the engine cylinder can abruptly escape the internal combustion engine's exhaust system through the exhaust valve. Upon the compressed gas escaping, the reciprocating piston engine system also loses its work performed.

In the third stroke, as also in normal engine operation, gas is drawn in via intake I. Gas is additionally sucked into the engine cylinder via exhaust valve E during the first stroke. This gas is compressed during both the second and fourth stroke.

Thus, in the two-phase decompression engine braking mode according to the invention, the braking energy achieved by compressing the gas is discharged from the reciprocating piston engine via the exhaust valves preferentially twice per engine operating cycle, at the respective end of the fourth stroke and at the respective end of the second stroke. The reciprocating piston engine must moreover perform further work in order for the engine cylinder to fill with gas again after each decompression in the first and third stroke. By varying the valve lift curve of exhaust valve E, the internal combustion engine can thus in each case offer mechanical resistance against externally imposed torque on the reciprocating piston engine during two phases of an operating cycle, i.e. during two revolutions of the crankshaft, without additional valves needing to be provided on the engine cylinder for engine braking operation.

The doubled opening of exhaust valve E enables particularly effective decompression via the exhaust system. The latter is also designed, unlike the intake system of an internal combustion engine, to use high pressures from the cylinders, particularly when a back pressure engine brake is additionally provided. Doubled decompression can also occur at optimized times, even though only the valve lift curve of exhaust valve E has been changed.

It was surprisingly shown that two-phase decompression engine braking operation is particularly effective when the actuation of the at least one first valve $5a$, $5b$, particularly an exhaust valve, occurs in the first phase of the engine braking mode at an approximate 660° KW to 720° KW, preferentially an approximate 680° KW to 700° KW and particularly preferentially an approximate 690° KW and/or at a valve stroke of approximately 50% to 100%, preferentially approximately 60% to 90%, particularly preferentially approximately 70% to 80%, and most preferentially approximately 75% of the valve stroke in engine operating mode, and in the second phase at an approximate 300° KW to 360° KW, preferentially an approximate 320° KW to 340° KW, and particularly preferentially an approximate 330° KW and/or at a valve stroke of approximately 5% to 25%, preferentially approximately 10% to 20%, and particularly preferentially approximately 15% of the valve stroke in engine operating mode. The closing of the at least one first valve $5a$, $5b$ preferentially occurs in the first phase at an approximate 180° KW to 240° KW, preferentially an approximate 200° KW to 220° KW and particularly preferentially an approximate 210° KW, and in the second phase, at an approximate 390° KW to 450° KW, preferentially an approximate 410° KW to 430° KW and particularly preferentially an approximate 420° KW.

By the first valve being actuated within these crankshaft angular ranges, a decompression of the gas in the engine cylinder takes place in each case at a point in time shortly before the engine piston reaches its top dead center of ignition (ZOT at 0° KW) or the top dead center of the load cycle (OT at 360° KW). The work performed on the compressed gas is thereby eradicated particularly effectively such that very good engine braking performance is achieved.

Figure 4:
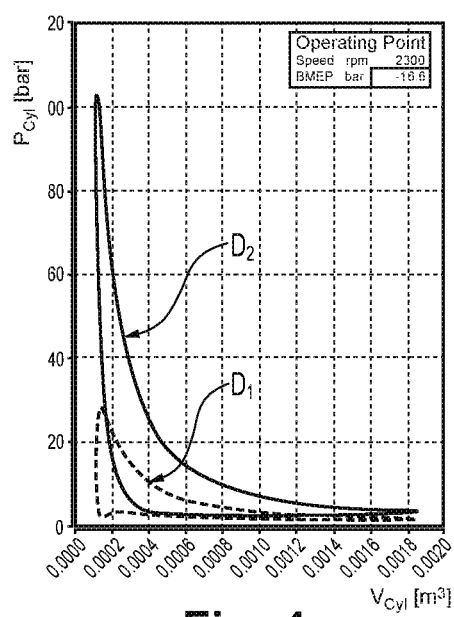
FIG. 4 is a partly schematic PV diagram showing development of the cylinder pressure during the four strokes of an internal combustion engine in two-phase decompression engine braking mode.

The PV diagram as depicted in FIG. 4 thereby results. This figure illustrates the development of the cylinder pressure by means of a pressure increase during the second stroke D1 with rapid drop due to the decompression upon the opening of the exhaust valve at the end of the second stroke and a rapid second rise of the pressure D2 during the fourth stroke with abrupt decrease of pressure at the end of the fourth stroke. The area below the curve thereby corresponds to the braking work performed. The inventive method can thereby preferentially achieve doubled braking work of an internal combustion engine. These are substantially higher valves, particularly 40% to 90%, preferentially 60% to 80%, than with prior art decompression engine braking systems in which braking work is at best performed only once per operating cycle.

Figure 3:
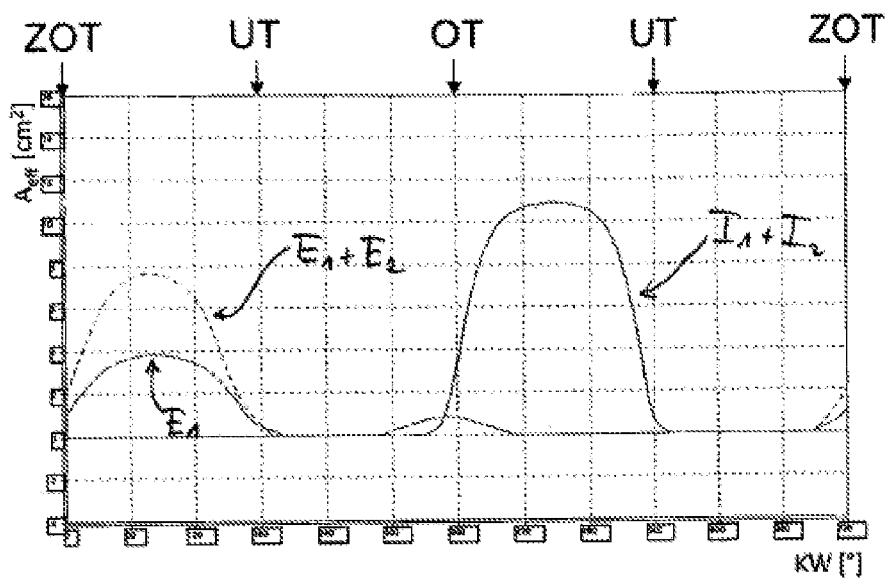
FIG. 3 shows a partly schematic representation of the development of the effective flow area of the valves of an internal combustion engine in two-phase decompression engine braking mode.

FIG. 3 shows a diagram of the effective flow area of intake valve I and exhaust valve E of a cylinder during two-phase decompression engine braking mode in square centimeters. Whereas only the valve lift curve for the opening of both intake valves $I_1$ and $I_2$, or second valves respectively, is shown in each case for intake valve I, both the effective average area for the opening of both exhaust valves $E_1$ and $E_2$, which in the present embodiment constitutes the first valve (dashed), as well as the effective average area upon the opening of only one exhaust valve $E_1$ are shown for exhaust valve E. It is evident from the FIG. 3 diagram that the effective flow area is twice as large when opening both exhaust valves $E_1$ and $E_2$ as when opening only one exhaust valve $E_1$.

Figure 5:
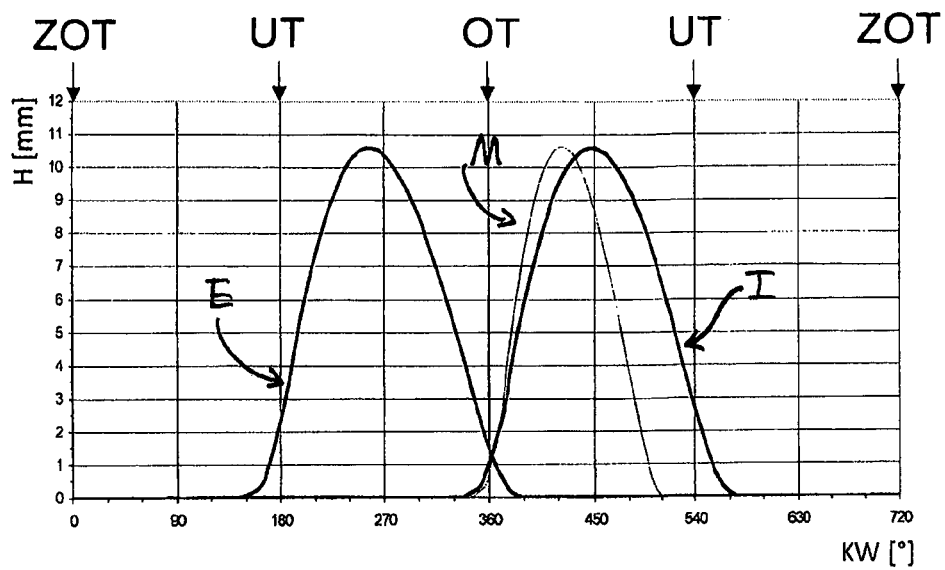
FIG. 5 shows partly schematic valve lift curves for an internal combustion engine in engine operation mode and in Miller cycle mode.

FIG. 5 illustrates a shifting of the valve lift curve of exhaust valve I into Miller cycle operation M, which can be realized with the valve-actuating device according to the invention.

Figure 6:
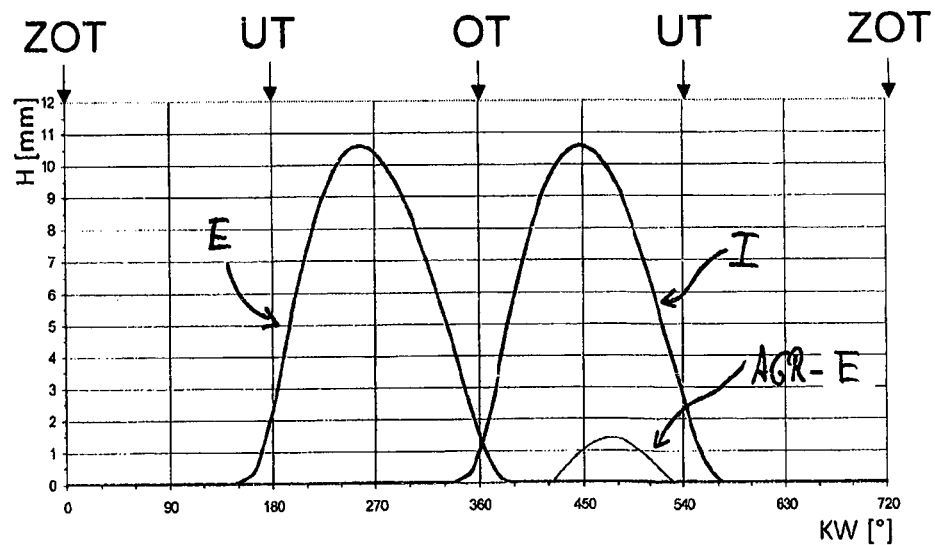
FIG. 6 shows partly schematic valve lift curves for an internal combustion engine in discharge exhaust gas recirculation mode.

FIG. 6 shows the valve lift curves of an intake valve I and an exhaust valve E in internal exhaust gas recirculation mode using the exhaust valve which are able to be realized with the valve-actuating device according to the invention. The exhaust valve E is hereby opened during the third stroke of the internal combustion engine, the intake stroke, so that exhaust gas from the exhaust system of the internal combustion engine also flows into the engine cylinder together with the fresh gas to be burned (curve AGR-E).

Figure 7:
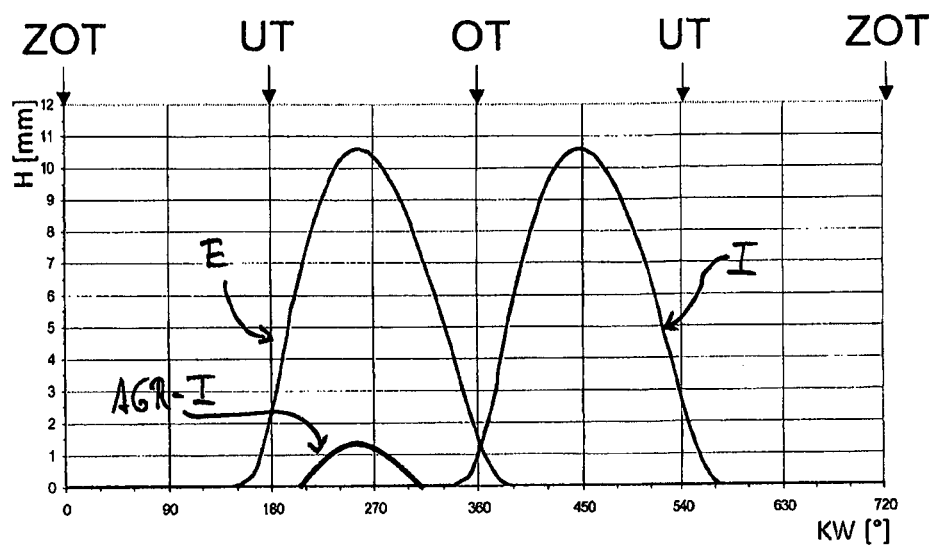
FIG. 7 shows partly schematic valve lift curves for an internal combustion engine in intake exhaust gas recirculation mode.

FIG. 7 illustrates the valve lift curves for an internal exhaust gas recirculation mode using intake valve I which are able to be realized with the valve-actuating device according to the invention.

The intake valve is hereby opened together with the exhaust valve during the blow-off phase in the second stroke of the internal combustion engine so that exhaust gas is not only blown off in the exhaust system of the internal combustion engine but also in the intake system. This exhaust gas is drawn into the engine cylinder again together with the fresh gas to be burned in the third stroke of the internal combustion engine, the intake stroke (curve AGR-I).

FIG. 8 shows the inventive valve-actuating device 1 in a first embodiment of the invention. The device preferentially comprises a first rocker arm part 2, a second rocker arm part 3, or third rocker arm part 32 respectively, and a fourth rocker arm part 33. The first rocker arm part 2 and the third rocker arm part 32 preferentially abut the cams 18, 19, 20, 21, 22 of a camshaft 4, preferentially by being respectively pressed against the profile of the cams 18, 19, 20, 21, 22 by the first pretensioning element 42 and the second pretensioning element 50. The pretensioning elements 42, 50 are hereby preferentially configured as retention springs. The valve control motion tapped by the respective cam profile, a first valve control motion in particular, is preferentially transmitted to the second rocker arm part 3 or fourth rocker arm part 33 respectively via a pivoting motion of the first rocker arm part 2 or the third rocker arm part 32 about rocker arm shaft 40.

In the present case, the second rocker arm part 3 and the fourth rocker arm part 33 are depicted as being integrally formed. However, it is also preferentially possible for each of them to be formed as one respective rocker arm part. The integral rocker arm part 3, 33 transmits the first or a second valve control motion to the valve bridge 24 by a further pivoting motion about the rocker arm shaft 40 over the first stop 26 and/or the second stop 27, which preferentially transmits the first or second valve control motion to one first valve $5a$ or to two first valves $5a$, $5b$. A securing apparatus 51 thereby preferentially fixes the first pretensioning element 42 and/or the second pretensioning element 50 on the cylinder head of an internal combustion engine.

Figure 9:
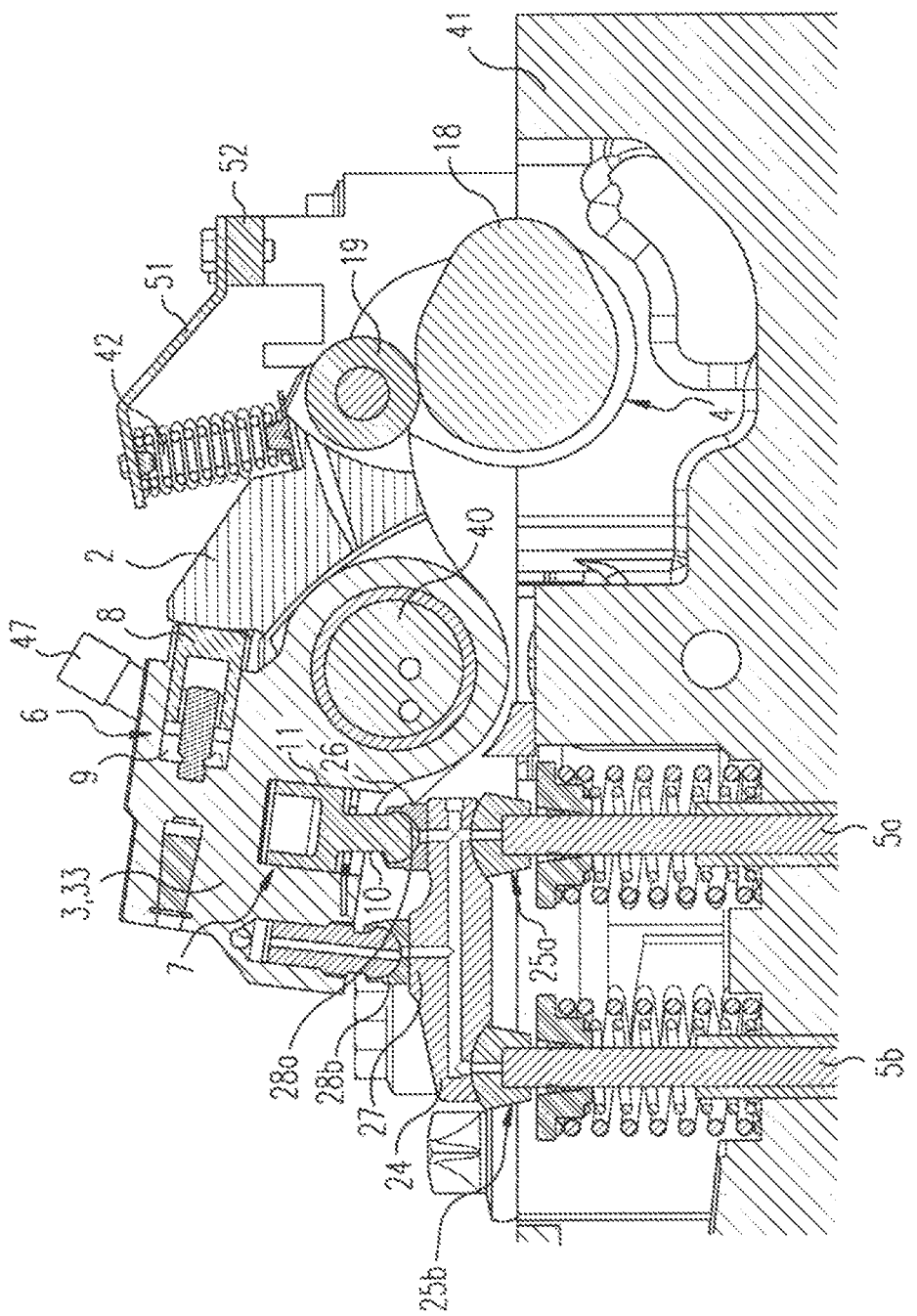
FIG. 9 shows a partly schematic sectional view through a cylinder head of an internal combustion engine comprising a valve-actuating device in accordance with the first embodiment of FIG. 8.

FIG. 9 depicts a cross section in the region of the cylinder head 41 of an internal combustion engine comprising the valve-actuating device 1 according to the first embodiment as depicted in FIG. 8. The tapping of the first valve control motion on the cam 18, a brake cam in particular, is preferentially effected by a roller 52 on the first rocker arm part 2. Although it would be just as possible for a tapping to be realized by the second rocker arm part sliding on the cam 18. A first switching element 6 is preferentially arranged between the first rocker arm part 2 and the second rocker arm part 3, its first piston 8 producing a positive connection between the first rocker arm part 2 and the second rocker arm part 3. Furthermore, the second rocker arm part 3 preferentially exhibits a second switching element 7 which preferentially comprises a second piston 10. Both the first piston 8 as well as the second piston 10 can preferentially be actuated by a control fluid respectively introduced into the first cylinder 9 and the second cylinder 11.

The first valve control motion is positively transmitted from the second rocker arm part 3 to the valve bridge 24, preferentially over a first stop 26 of the second piston 10 or over a second stop 27 of the second rocker arm part 3. From the valve bridge 24, the first valve control motion is preferentially ultimately transmitted to the valves 5a and 5b which are accommodated in recesses of the valve bridge 24. This transmission as well is preferentially a positive transmission. The first stop 26 and the second stop 27 thereby each preferentially comprise a respective second joint 28a, 28b to enable the stops 26, 27 to adapt to an inclination of the valve bridge 24. Furthermore, the valve bridge in each case preferentially comprises first joints 25a, 25b to one first valve 5a and to the other first valve 5b, by means of which a valve bridge 24 inclination vis-à-vis the first valves can be equalized.

On the whole, the first valve control motion is preferentially transmitted positively from the profile of the cam 18 via the roller 52, the first switching element 6, the second rocker arm part 3 and second switching element 7 and first stop 26, or over the second stop 27 respectively, to the valve bridge 24 and then on further to the first valves 5a and 5b. Activating/deactivating the first switching element 6 can preferentially control whether and to what extent the first valve control motion of the first rocker arm part 2 is transmitted to the second rocker arm part 3.

Activating/deactivating the second switching element 7 can furthermore preferentially control whether only the first stop 26, at first the first stop 26 and then the second stop 27, or the first stop 26 and the second stop 27 simultaneously engage with the valve bridge 24.

Figure 10:
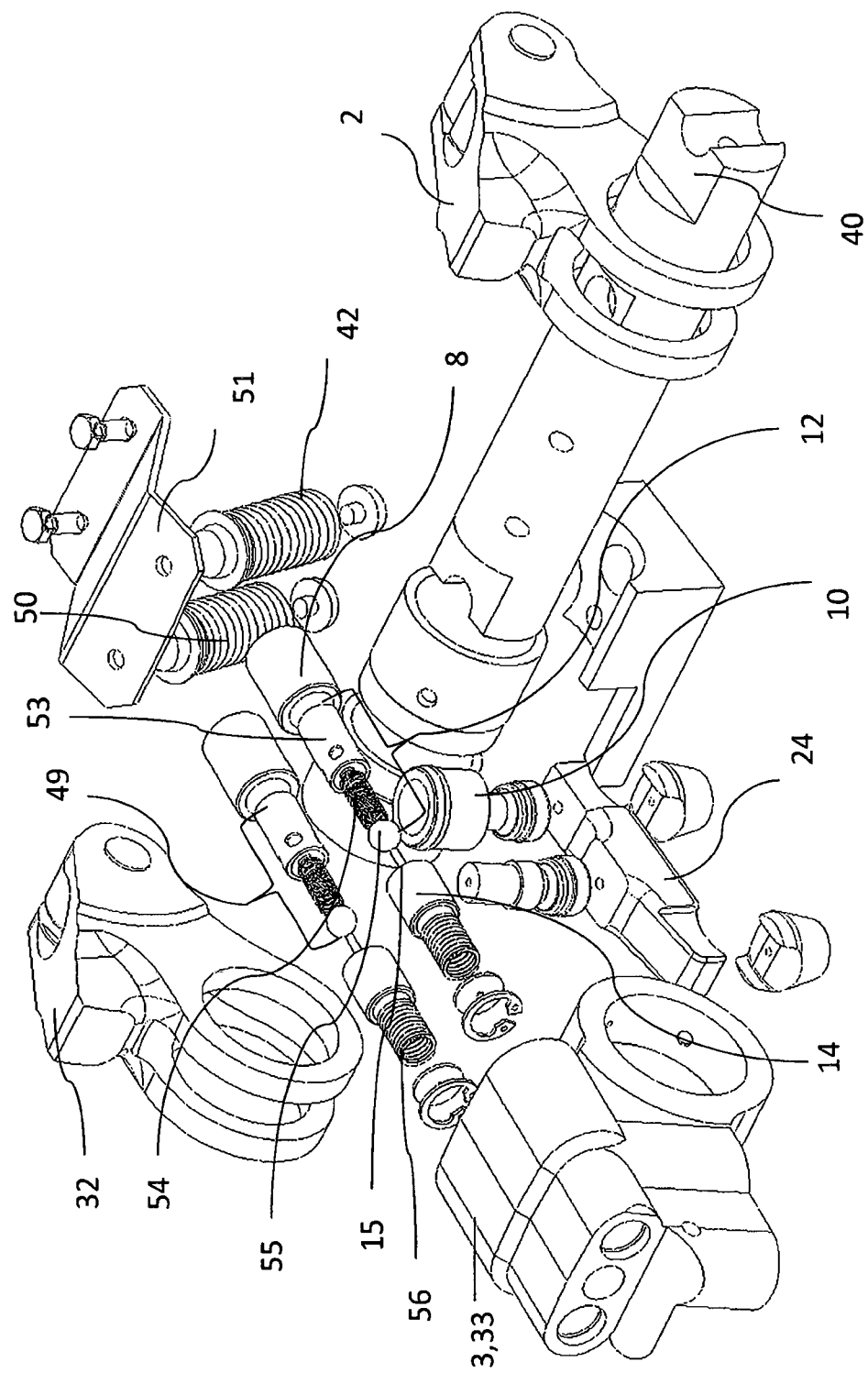
FIG. 10 shows a partly schematic exploded view of a valve-actuating device according to the first embodiment from FIG. 8.

FIG. 10 shows an exploded view of the valve-actuating device 1 according to the first embodiment from FIG. 8. Additionally to the elements described with reference to FIGS. 8 and 9, the exploded view illustrates the individual elements of the first switching element 6 and the third switching element 29. Only the elements of the first switching element 6 will be addressed at present, as the third switching element 29 is of preferentially identical construction.

The first switching element 6 preferentially comprises the first piston 8, which is arranged in a first cylinder 9 formed by the second rocker arm part 3. The first switching element 6 preferentially further comprises a first check valve arrangement 12, which in turn preferentially consists of a first retention element 53, particularly a fluid-permeable cylinder having a smaller diameter than the first piston, a first closing force element 54, particularly a spring, and a first closing element 55, particularly a ball. Furthermore, the first switching element 6 preferentially comprises a first auxiliary piston 14, wherein the associated first auxiliary cylinder 13 is also preferentially formed by the second rocker arm part 3 as well as an opening force element, particularly also a spring.

Figure 11:
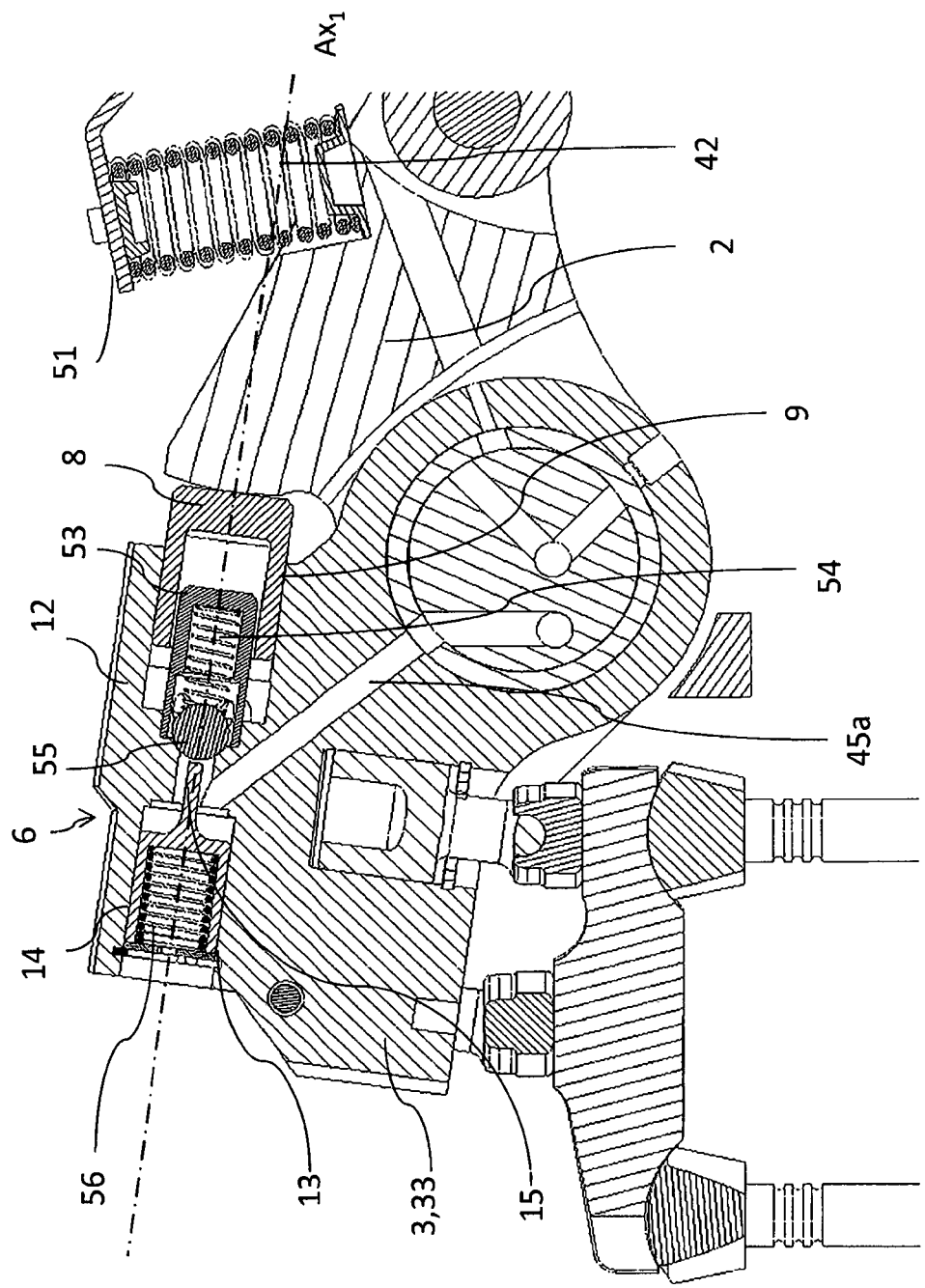
FIG. 11 shows a partly schematic cross section through the inventive valve-actuating device according to the first embodiment from FIG. 8 along sectional plane III-III.

FIG. 11 depicts a cross section in the III-III sectional plane of the valve-actuating device 1 according to the first embodiment from FIG. 8. This depiction also encompasses a cross section through the first switching element 6. Preferentially, the first cylinder 9 and the first auxiliary cylinder 13 are arranged on the same axis so that also the further elements of the first piston 8, first auxiliary piston 14 and first retention element 53 are arranged on the same axis. A closing force of the first closing force element 54 preferentially acts on the first closing element. If, as in the present case, a control fluid has flown into the first cylinder 9 via the check valve arrangement 12, a compressive force of the control fluid produced by the first piston 8 also acts on the first closing element 55 when actuated by the first rocker arm part 2. The force of the first opening force element 56 acts on the first auxiliary piston 14 which moves same, and thus actuating element 15, in the direction of the first closing element 55. In the present case, control fluid pressure is built up in the first auxiliary cylinder 13 via a first inlet 45a, which causes the first auxiliary piston 14 to remain in a retracted position against the opening force of opening force element 56.

Figure 12:
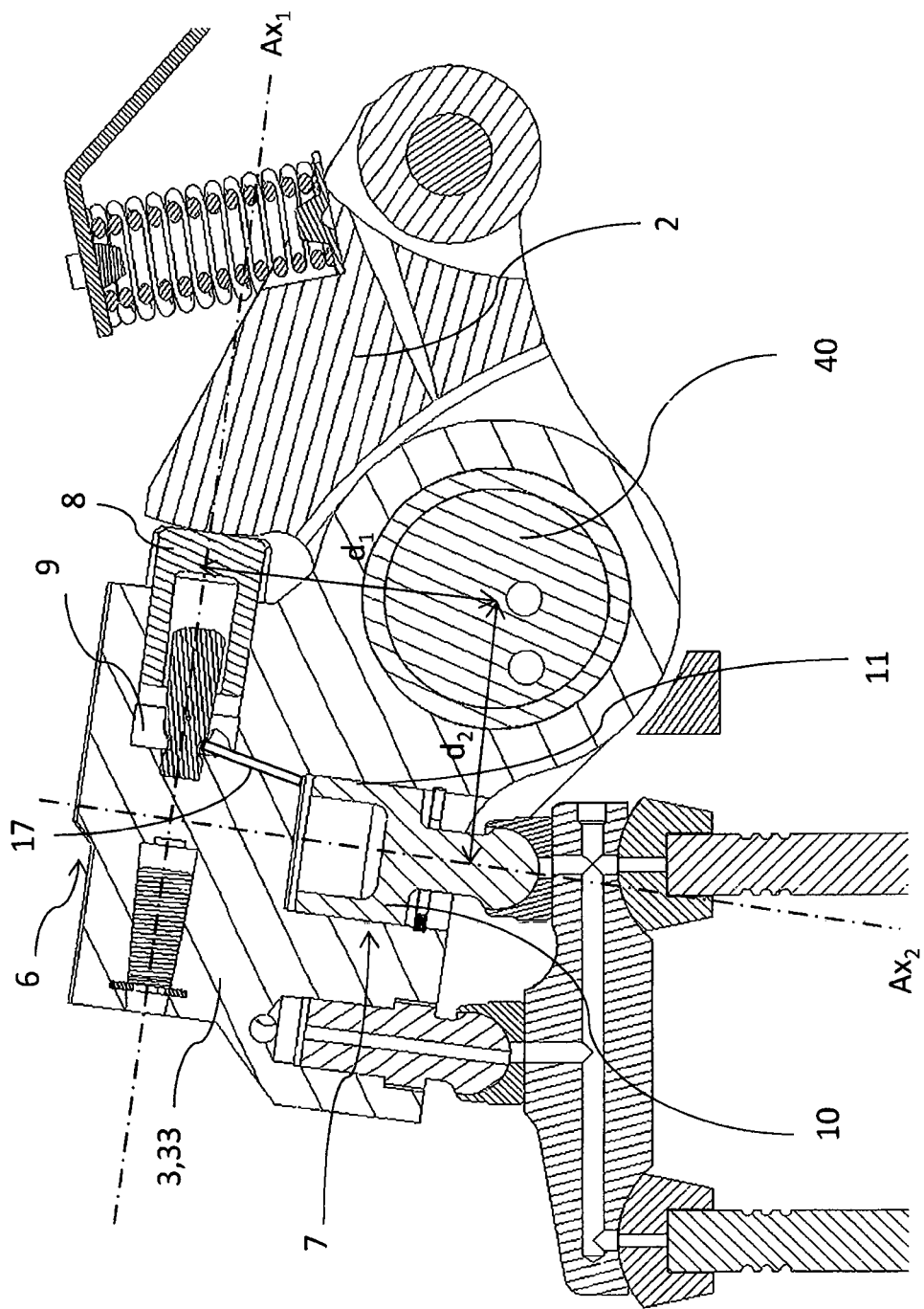
FIG. 12 shows a partly schematic cross section through the inventive valve-actuating device according to the first embodiment from FIG. 8 along sectional plane II-II.
Figure 13:
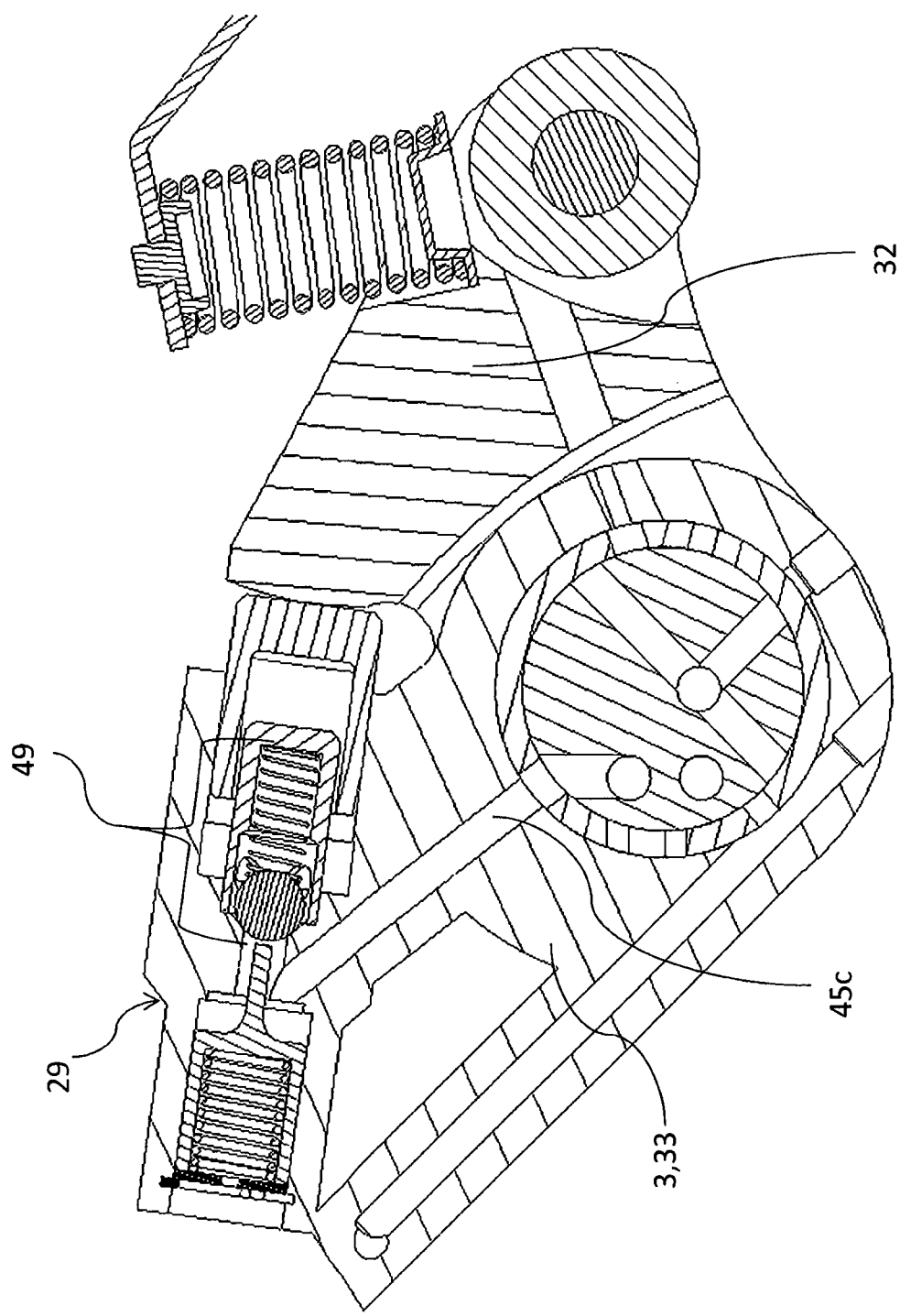
FIG. 13 shows a partly schematic cross section through the inventive valve-actuating device according to the first embodiment from FIG. 8 along sectional plane I-I.

FIGS. 12 and 13 depict further cross sections along sectional planes II-II and I-I of the valve-actuating device 1 from FIG. 8. It can be clearly recognized that the third switching element 29 with the third check valve arrangement 49 is constructed identically to the first switching element 6, whereby the third switching element 29 is preferentially supplied with control fluid by a third inlet 45c. It can further be recognized that the first cylinder 9 of the first switching element 6 is connected to the second cylinder 11 of the second switching element 7, preferentially by means of a first connecting line 17 and preferentially fluidly connected. The fluidic connection preferentially connects the first piston 8 and the second piston 10 as a master/slave piston arrangement. Utilizing the distance $d_1$ of the axis $Ax_1$ of the first cylinder 9 from the center of rocker arm shaft 40 and the distance $d_2$ of axis $Ax_2$ of the second cylinder 1 from the center of rocker arm shaft 40 as well as the effective area of the first piston 8 and the effective area of the second piston 10 can thus control whether the first piston 8 or the second piston 10 is shifted out of a deactivated position into an activated position first and/or in which position the first piston 8 and the second piston 10 are in their respective cylinder. Preferentially, these relative positions are determined by the second piston 10: If it is fully extended, the first piston 8 has not yet reached its maximum position since the torque produced by the second piston 10 is preferentially greater than that produced by the first piston.

As further follows from FIGS. 12 and 13, the effective direction of the first switching element 6, the second switching element 7 and/or the third switching element 29 exhibits at least one vertical component to a rocker arm shaft 40, in particular substantially tangential to a circle around the rocker arm shaft 40. Preferentially, the effective directions of all three switching elements 6, 7, 29 are tangential to a circle around the rocker arm shaft 40. Particularly preferentially, the effective direction of the first switching element 6, the second switching element 7 and/or the third switching element 29 exhibits at least one parallel component to the direction of movement of the first rocker arm part 2 and the second rocker arm part 3. Advantageously, the effective direction of the first switching element 6 and the effective direction of the second switching element 7 and/or the axis $Ax_1$ of the first switching element 6 and the axis $Ax_2$ of the second switching element 7 are thereby at a second angle 11 to one another of approximately 80° to 100°, preferentially of approximately 85° to 95° and most preferentially of approximately 90°.

Summarizing FIGS. 12 and 13, it can be stated that depending on the switching state of the first switching element 6 and the third switching element 29, a first valve control motion can be transmitted via the first rocker arm part 2 and the second rocker arm part 3 to the first valve, or a second valve control motion can be transmitted via the third rocker arm part 32 and the fourth rocker arm part 33 to first valves 5a, 5b. Preferentially, the valve lift, the valve opening point, the valve closing point and/or the valve lift curve can hereby be in general varied. Preferentially, the second rocker arm part 3 and the fourth rocker arm part 33 are integrally formed. Doing so achieves particularly high system integration. Also, the first switching element 6, the second switching element 7 and/or the third switching element do not need to be designed as hydraulic switching elements but instead can also be realized by any other apparatus suitable as a switching element. Particularly electric/electronic actuators can be used as switching elements.

The valve-actuating device according to the first embodiment of the invention provides the particular advantage that the cooperating of the first switching element 6 and the second switching element 7 as well as the arrangement of the first stop 26 above a first valve 5a and the second stop 27 centrically between the one first valve 5a and the other first valve 5b affords the possibility of opening both first valves 5a, 5b at the same time, or first the one first valve 5a and then the other first valve 5b, upon the second rocker arm part 3 being actuated by the first rocker arm part 2. The same also applies to the closing process.

Figure 14:
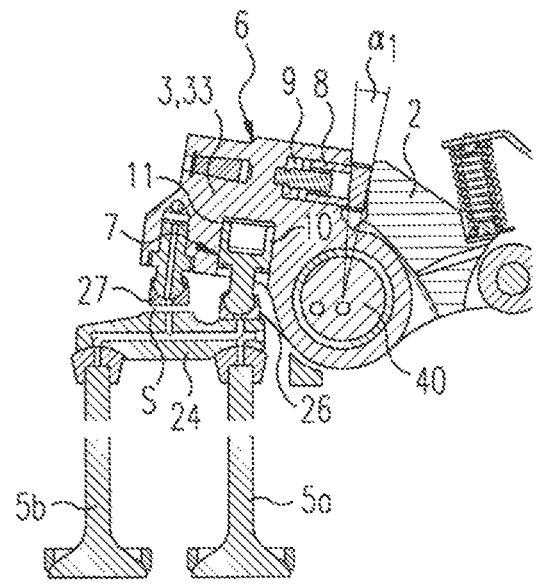
FIG. 14 shows a partly schematic cross section of a valve-actuating device according to the first embodiment from FIG. 8 along sectional plane II-II in a first procedural step of an engine braking method.
Figure 15:
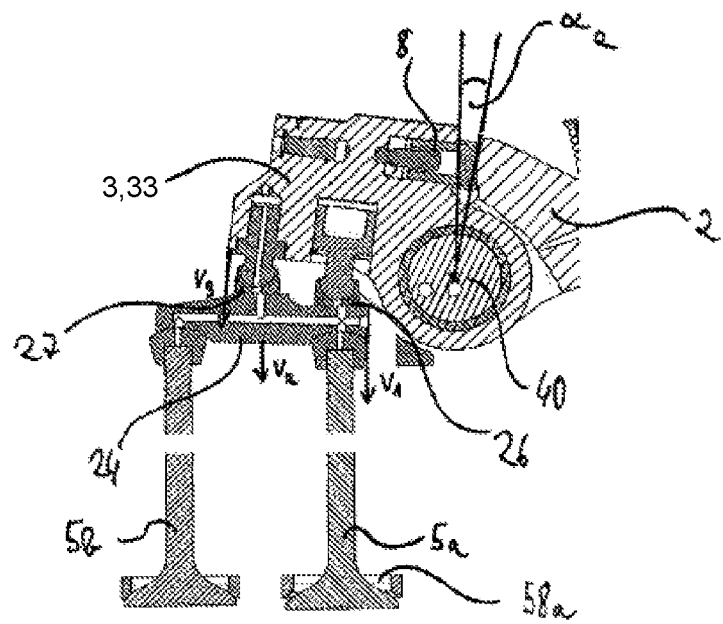
FIG. 15 shows a partly schematic cross section through an inventive valve-actuating device according to the first embodiment from FIG. 8 during a second procedural step of an engine braking method including valves.
Figure 16:
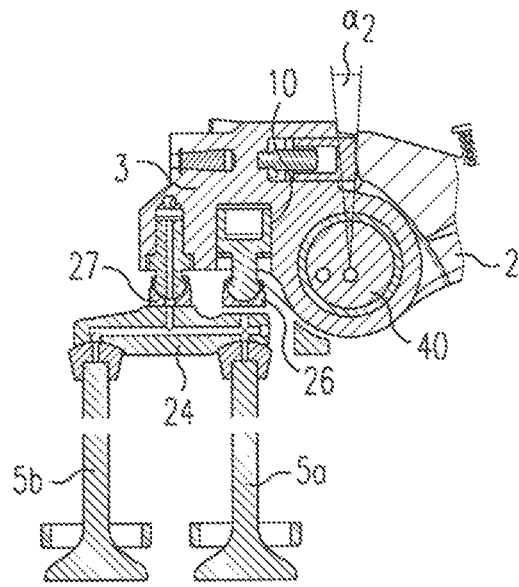
FIG. 16 shows a partly schematic cross section through an inventive valve-actuating device according to the first embodiment from FIG. 8 during a third procedural step of an engine braking method including valves.

A corresponding method for valve actuation will be defined on the basis of FIGS. 14 to 16, all three of which depict a cross section of the valve-actuating device 1 according to the first embodiment along the II-II sectional plane from FIG. 8.

In a first step of the procedure, depicted in FIG. 14, the first cylinder 9 of the first switching element 6 and the second cylinder 11 of the second switching element 7 are subjected to a control pulse which is in particular transmitted via the first inlet 45a and/or the second inlet 45b by means of the control fluid. As basically illustrated in FIG. 12, due to the ratio of the effective area $A_1$ of the first piston 8 to the effective area $A_2$ of the second piston 10 and the distance $d_1$ of the first cylinder 9 axis from the rocker arm shaft to the distance $d_2$ of the second cylinder 11 from rocker arm shaft 40 ($A_2*d_2 > A_1*d_2$), at first only the second piston is pushed out of the second cylinder 11 into its final position, whereas the first piston 8 still remains in its in initial position or is only extended out of the first cylinder 9 into an intermediate control position. Preferentially, this process occurs when the first rocker arm part 2 is not tapping any first valve control motion on the cam 18. By the supplying of the control pulse, the second rocker arm part 3 presses on the valve bridge 24 by the first stop 26, whereby the first stop 26 preferentially acts on the valve bridge 24 eccentrically and particularly preferentially in the region above a first valve 5a.

The pressure which the first stop 26 exerts on the one first valve 5a produces an angle $\alpha_1$ between the first rocker arm part 2 and the second rocker arm part 3 relative to the rocker arm shaft 40. At the same time, the second stop 27 is raised from the valve bridge 24 so that a gap S forms between the stop 27 and the valve bridge 24.

In a second step of the procedure, depicted in FIG. 15, a cam 18 preferentially applies force or torque respectively on the second rocker arm part 3 via the first rocker arm part 2 and the first piston 8. The second rocker arm part 3 is thereby pivoted about the rocker arm shaft 40 in the direction of the first valve 5a, 5b. By the time the second stop 27 closes the gap S, and makes contact with the valve bridge 24, the one first valve 5a has already been actuated by the motion of the second rocker arm part 3, whereby it raises from the valve seat and partially clears valve opening 58a. Corresponding valve lift curves for the one first valve 5a (dashed) and the other first valve 5b (dotted) are depicted in FIG. 30. The other solid valve lift curve depicted is that of at least one second valve.

Due to the opening of the one first valve 5a, a large portion of the compressed gas in the cylinder can escape during engine braking mode. Since initially; i.e. at particularly high pressure, only low volumes of the gas can escape little by little through the only slightly opened one first valve 5a, substantially less noise is produced than would be the case had both valves been opened simultaneously and the full high pressure of the compressed gas escapes all at once. A further advantage of the arrangement is that the mechanical load on the valve-actuating device 1, particularly on rocker arm parts 2, 3, 32, 33, 34, 35, 37, 38, is kept low by only the one first valve 5a opening, despite the high pressure when opening in braking mode.

The pivoting motion of the second rocker arm part 3 sets a velocity $v_1$ for the end of the valve bridge 24 on which the first stop 26 acts, which is indicated in FIG. 15 by a vector. Because the other end of the valve bridge 24 is at rest, a center area of the valve bridge, where the second stop 27 acts, is at a velocity $v_2$ which is reduced by approximately half. At the moment at which the gap S is closed and the stop 27 meets the valve bridge 24 at velocity $v_3$, the force of the impact is thereby reduced by the valve bridge already being moved at said location at velocity $v_2$ in the direction in which it is to be displaced by the stop 27. The first piston 8 has now preferentially also reached its maximum extended switching position, whereby an angle $\alpha_2$ is preferentially formed between the first rocker arm part 2 and second rocker arm part 3 relative to the rocker arm shaft 40 which is preferentially more or less the same as angle $\alpha_1$ according to FIG. 14, albeit preferentially somewhat smaller than angle $\alpha_1$.

FIG. 16 depicts the position of a valve-actuating device 1 according to the first embodiment after a third procedural step of the valve actuation method has been performed. The second rocker arm part 2 is now pivoted by the cam 18 so far around the rocker arm shaft 40, and thus also the second rocker arm part 3, that preferentially only the second stop 27 now engages the valve bridge 24. Even at maximum extended switching position of the second piston 10, the first stop 26 is preferentially no longer in contact with the valve bridge 24 or at least exerts no further force on same. The displacement of the two first valves 5a, 5b is now preferentially solely effected by the actuating of the second stop 27. Further preferentially, these two valves 5a, 5b are opened to the same extent in this state by the preferentially centric arrangement of the second stop 27 on the valve bridge 24. This position is suited both to using the first valves 5a, 5b as exhaust valves E during a first stroke intake phase in engine braking mode as well as to blowing off burned (exhaust) gas in the second stroke of engine operation or even to normal actuation of the intake valves I in engine operation mode. By both first valves 5a, 5b opening, upon which the maximum pressure escapes the engine cylinder, optimal filling of the engine cylinder can then follow in the subsequent intake stroke.

FIGS. 17a and 17b will be referenced below in describing the function of the first switching element 6 (FIG. 17b) and the third switching element 29 (FIG. 17a) during engine operating mode.

FIG. 17a shows the third switching element 29, which is preferentially hydraulically supplied a control pulse by means of the control fluid via the inlet 45c, indicated by the arrows in third inlet 45c. The control pulse produces a pressure in the voids of the third auxiliary cylinder 59 which moves a third auxiliary piston 60 away from a third check valve arrangement against the resistance of a third opening force element 61, particularly a spring. At the same time, the third cylinder 31 is filled by means of a fluidic connection by the third check valve arrangement 49 being opened by the control pulse of the control fluid. When the pressure in the third cylinder 31 reaches the pressure of the control fluid, the check valve arrangement 49 closes from the force of a third closing force element 62, particularly a spring. When the third piston 30 is subjected to a force or torque of a second valve control motion by the third rocker arm part 32, the third piston 30 essentially stays in its outermost switching position taken in response to the control pulse and the force or torque is transmitted to the fourth rocker arm part 33.

Conversely, the control fluid is discharged from the first switching element 6 through the first inlet 45a during operating mode. Due to the lower pressure in the first auxiliary cylinder 13, the first auxiliary piston 14 moves toward the first check valve arrangement 12 in response to the force exerted on it by the first opening force element 56, particularly a spring, whereby actuating element 15 opens the first closing element 55, particularly a valve ball, against the force of the first closing force element 54 by means of the force of the first opening force element 56. In so doing, a fluidic connection opens between the first cylinder 9 and the first auxiliary cylinder 13 such that the control fluid also flows out of the first cylinder 9. If the first rocker arm part 2 now exerts a force/torque on the first piston 8, the first piston 8 displaces in the first cylinder 9 and the force/torque of the first valve control motion of the first rocker arm part 2 is not transmitted to the second rocker arm part 3, it therefore being a so-called "lost" motion.

FIGS. 18a and 18b depict the function of the first switching element 6 (FIG. 18b) and the third switching element 29 (FIG. 18a) during engine braking operation. In each case, the function is hereby identical to the implementations of FIGS. 17a and 17b, wherein the implementations relative to FIG. 17a now apply to FIG. 18b and the implementation relative to FIG. 17b now applies to FIG. 18a. Ultimately, force/torque of a second valve control motion is no longer transmitted from the third rocker arm part 32 to rocker arm part 33 in these reversed switching positions since the third piston 30 can be displaced in the third cylinder 31. On the other hand, a force/torque of the first valve control motion is now transmitted from the first rocker arm part 2 to the second rocker arm part 3 via the first piston 8 since the first piston 8 is fixed in an extended switching position in the first cylinder 9.

FIG. 19 shows a second embodiment of the valve-actuating device 1 according to the invention. This embodiment differs from the first embodiment substantially by additionally comprising a first blocking element 16. The first blocking element 16 serves to ensure that a cylinder does not leave a defined control position upon pressure dropping in an inlet 45a, 45b, 45c, 45d, 45e. This is of particular advantage when the internal combustion engine is to be operated in normal engine mode for a longer period of time and thus transmission of a valve control motion to exhaust valve E or inlet valve I for normal operation, e.g. briefly upon a drop in a switching element's control pressure in emergency operating mode, needs to be ensured on a sustained basis. This can be further advantageous when no hydraulic control pressure has yet built up in the inlets 45a, 45b, 45c, 45d, 45e to the control elements upon an internal combustion engine being started such that the switching elements 6, 7, 29, 36, 39 cannot be controlled. If no additional control fluid pump, e.g. an electrical pump, for building up a control pressure in inlets 45a, 45b, 45c, 45d, 45e independently of the internal combustion engine operation is provided, it would then not be possible to start the internal combustion engine without a first blocking element 16.

As depicted in FIG. 20, the first blocking element 16 comprises a locking piston 63 able, for example, to lock the third piston 30 of the third switching element 29 in an extended switching position. The blocking element 63 thereby locks into a control position as soon as the piston 30 assumes a corresponding control position. To block the third piston 30, and thus prevent transmission of the second valve control motion to the fourth rocker arm part 33 during engine braking operation, it can be provided to fluidly connect the locking cylinder 64 to the first auxiliary cylinder 13 so that whenever there is control pressure or a control pulse respectively as the case may be in the first auxiliary cylinder, the first blocking element 16 is in an open position since it is pressed upward by the same pressure as within the first auxiliary cylinder 13. Doing so thus ensures that it is always only the first valve control motion being transmitted, not, however, the second valve control motion, even when the third piston 30 is displaced into the extended position from which it is normally blocked by the first blocking element 16 or the first locking piston 63 respectively.

FIG. 21 depicts a third embodiment of the valve-actuating device 1 according to the invention. This embodiment additionally comprises a fifth rocker arm part 34 and a sixth rocker arm part 35 as well as a fourth switching element 36. These additional elements enable a third valve control motion to be transmitted to at least one second valve (not shown) in the embodiment of the intake valve described herein, wherein the third valve control motion for example realizes the movement dictated by the profile of the intake cam 21. The interacting of the additional elements compared to the first embodiment is thereby substantially identical to the respective elements of the first embodiment. The third embodiment can of course be combined with the second embodiment. Providing a switching element 36, e.g. on the intake valve, enables also being able to even out dynamic valve play for same, realize cylinder cutoff, or vary the intake point or the valve lift curve respectively of the intake valve I, for example in order to realize Miller cycle or Atkinson cycle operation.

FIGS. 22 and 23 depict a fourth embodiment of the inventive valve-actuating device 1. Compared to the third embodiment, this fourth embodiment additionally comprises a seventh rocker arm part 37 and an eighth rocker arm part 38 as well as a fifth switching element 39. These additional elements enable a fourth valve control motion to be transmitted for example from a Miller cam 22 to at least one second valve (not shown), particularly an intake valve I. The interacting of the additional elements compared to the first and second embodiment is thereby substantially identical to the respective elements in said embodiments. The third embodiment can of course be combined with the second embodiment. Providing for the transmission of a fourth valve control motion enables for example also being able to control the intake valves both during engine operating mode as well as in another operating mode defined by the fourth valve control motion. As depicted in FIG. 22, it is preferential for the sixth rocker arm part 35 and the eighth rocker arm part 38 to be integrally formed, thereby likewise achieving high system integration.

Also the fourth switching element and/or the fifth switching element preferentially comprise a respective piston and cylinder for hydraulic control. As was described with respect to the first and the third switching element, these switching elements can also be realized in some other manner, preferentially as electrical/electronic switching elements.

As regards the further details of the structure of the fifth rocker arm part 34, sixth rocker arm part 35, fourth switching element 36, seventh rocker arm part 37, eighth rocker arm part 38 and fifth switching element 39 as a whole, reference is made to the implementations relative to the first embodiment and the second embodiment in respect of FIGS. 8 to 20. In particular, this aggregate can also exhibit a second blocking element.

Variable valve control or variable valve trains respectively can be realized in the case of all of the above-cited embodiments of the valve-actuating device, although particularly in the case of the third or fourth embodiment. The control pulse therein is selectively fed only to the first switching element 6 and/or second switching element 7 and fourth switching element 36 or fifth switching element 39 during a first engine operating mode and only to the third switching element 29 and fourth switching element 36 or fifth switching element 39 during a second engine operating mode. Both engine operating modes can hereby provide for fundamentally different valve lift curves for both the at least one first valve, particularly an exhaust valve E, as well as for the at least one second valve, particularly an intake valve I. Further operating modes of engine operation can be additionally provided by adding further rocker arm parts and cams to the camshaft.

FIG. 24 and FIG. 25 depict a fifth embodiment of the inventive valve-actuating device 1. This embodiment differs from the first, third and fourth embodiment by the additional provision of a limiting element 43, which is preferentially mountable on the fourth rocker arm part 33 for limiting the control position of the third piston 30. The interacting of the additional elements compared to the first embodiment is thereby substantially identical to the respective elements of the first, third and fourth embodiment. The fifth embodiment can of course be combined with the first, third and fourth embodiment and/or with the second embodiment. The third piston 30 hereby preferentially has at least one limit groove 65 which cooperates with the limiting element 43. The limit groove 65 extends at least partly over the circumference of the third piston 30. As depicted in FIG. 25, the limiting element 43 is preferentially screwed onto a frontal area of the fourth rocker arm part 33 encircling the third piston 30. Correspondingly, the limiting element 43 can also be disposed on the eighth rocker arm part 38 of the fourth embodiment according to FIG. 22, wherein it then limits the motion of the fifth switching element 39. A sixth switching element, corresponding to the second switching element 7 in FIG. 26, is then preferentially provided for realizing different types of operation, e.g. exhaust gas recirculation operation.

The following will describe the function of limiting element 43 using FIGS. 26 and 27 as a basis. In this case, a second inlet 45b can subject the second switching element 7 to a control pulse independently of the first switching element 6. When the third switching element 29 is activated and the second switching element 7 deactivated, a gap forms between the integral second/fourth rocker arm part 3, 33 and the third rocker arm part 32 due to the third switching element 29, or the third piston 30 respectively, not being able to extend out far enough to come into contact with the third rocker arm part 32. Because of this gap, only large lobes 66 of the cam 20 will be transmitted from the first rocker arm part 2 to the integral second/fourth rocker arm part 3, 33 whereas small lobes 67 are not transmitted and thus result in lost motion of the third rocker arm part 32.

By contrast, both the second switching element 7 as well as the third switching element 29 are activated in FIG. 27. By virtue of switching element 7 being activated, limit stop 27 is raised from the valve bridge 24 such that a gap S forms between the second stop 27 and the valve bridge 24. The third piston 30 is now in continuous contact with the third rocker arm part 32 such that each lobe 66, 67 of the cam 20 results in an opening of at least one valve. In the case of the small lobe 67, this is only the one first valve 5a since the gap S is not fully closed by a valve control motion generated by this lobe. In the case of the large lobe 66, it is the two first valves 5a and 5b, whereby corresponding to the function depicted in FIG. 16, preferentially the first stop 26 is hereby raised from the valve bridge 24 by the actuation of the second stop 27 of the valve bridge 24. A configuration as shown in FIG. 26 and FIG. 27 is particularly suited to realizing internal exhaust gas recirculation operation as is also depicted in FIGS. 6 and 7. While the large lobe 66 defines the "normal" valve lift for the operation of the internal combustion engine in engine operating mode, the small lobe 67 of the cam 20, particularly an AGR cam, defines a valve lift curve during the respective opening phase of the other valve; i.e. exhaust valve E or intake valve I. Either exhaust gas from the exhaust system of the internal combustion is hereby drawn out additionally to the combustible mixture during the third stroke or exhaust is blown into the engine's intake system during the second stroke so as to be again drawn into the respective engine cylinder during the third stroke.

When the valve-actuating device according to the fifth embodiment is used for exhaust gas recirculation operation, for example, it is advantageous for the second switching element 7, or a corresponding six switching element respectively, to be able to be actuated independently of the first switching element 6. In order to nevertheless ensure that the second switching element 7 or the sixth switching element does not leave its control position even when subject to high loads, it is preferential in the case of this embodiment for a second check valve arrangement 68 to be provided which functions substantially identically to the first check valve arrangement 12 described on the basis of FIGS. 17a, 17b, 18a and 18b.

As depicted by means of FIGS. 28 and 29, this second check valve arrangement 68 is preferentially arranged in the fourth rocker arm part 33 or in the eighth rocker arm part 38, substantially parallel to the second switching element 7 or the sixth switching element. The fluidic connection between the second piston 10 and high-pressure chamber 69 is hereby realized by means of a high-pressure line 70.

Various interconnections of switching valves 47 to the respective valve-actuating device 1 of six engine cylinders 44a, 44b, 44c, 44d, 44e, 44f for an internal combustion engine having varying numbers of functionalities will be described below on the basis of FIGS. 32, 34 and 36.

FIGS. 31, 33 and 35 hereby depict the respective associated form of the rocker arm shaft 40 with the different inlets required for the respective functionalities of the internal combustion engine's operating modes. 4/2-way solenoid valves are in particular used as the switching valves. 2/2-way solenoid valves can also be used for switching valves 47e and 47g.

The interconnections are not limited to six-cylinder internal combustion engines but can also be used in eight or twelve engine cylinders as well as with other engine cylinders of even or uneven number. The circuitry according to FIG. 32 thereby encompasses the internal combustion engine's functions of normal operating mode, engine braking mode and cylinder deactivation.

The circuitry according to 34 thereby encompasses the internal combustion engine's functions of normal operating mode, engine braking mode, cylinder deactivation and Miller cycle operation. The circuitry according to FIG. 36 thereby encompasses the functions of normal operating mode, engine braking mode, variable cylinder deactivation, Miller cycle operation and internal exhaust gas recirculation operation.

To illustrate system integration when using the valve-actuating device according to the embodiments, the valve-actuating devices 1 are re-assembled in the region of the engine cylinder heads 41 of a six-cylinder internal combustion engine in FIGS. 37 to 40. FIG. 37 hereby illustrates an arrangement of valve-actuating devices 1 as per the first embodiment, FIG. 38 an arrangement of valve-actuating devices 1 as per the second embodiment, FIG. 39 an arrangement of valve-actuating devices 1 as per the third embodiment and FIG. 40 an arrangement of valve-actuating devices 1 as per the fourth embodiment.

These representations accentuate the high system integration of the inventive valve-actuating device 1 which only requires insignificantly more components and installation space even as system complexity increases from the first to the fifth embodiment.

The inventive valve-actuating device can be used both in reciprocating piston engines, particularly internal combustion engines, or engines having one camshaft 4, particularly an overhead camshaft (OHC) respectively, as well as in engines having two camshafts, particularly two overhead camshafts 4, 71 (DOHC).

The embodiments described above would need to be accordingly adapted to the different geometry of such an engine having two camshafts 4, 71.

FIG. 41 hereby shows, purely as an example, an inventive valve-actuating device 1 in which the two stops 26, 27 are arranged next to each other substantially parallel to the axis of a first camshaft 4 and/or a second camshaft 71.

FIG. 42 depicts one example geometry of the arrangement of exhaust valves E/intake valves I in an inventive internal combustion engine.

FIG. 43 depicts a further geometry of exhaust valves E and intake valves I of another embodiment of an inventive internal combustion engine. The respective valves, which are actuated by means of an inventive valve-actuating device 1, are arranged here in slightly offset pairs. Compared to the embodiment from FIG. 42, the advantage here is that less installation space is needed in the direction of the axis of the first camshaft 4 or second camshaft 71 respectively.

LIST OF REFERENCE NUMERALS valve-actuating device 1
first rocker arm part 2
second rocker arm part 3
first camshaft 4
first valve 5, 5a, 5b
first switching element 6
second switching element 7
first piston 8
first cylinder 9
second piston 10
second cylinder 11
first check valve arrangement 12
first auxiliary cylinder 13
first auxiliary piston 14
actuating element 15
first blocking element 16
first connecting line 17
brake cam 18
exhaust cam 19
exhaust AGR cam 20
intake cam 21
Miller cam 22
intake AGR cam 23
valve bridge 24
first joint 25a, 25b
first stop 26
second stop 27
second joint 28a, 28b
third switching element 29
third piston 30
third cylinder 31
third rocker arm part 32
fourth rocker arm part 33
fifth rocker arm part 34
sixth rocker arm part 35
fourth switching element 36
to seventh rocker arm part 37
eighth rocker arm part 38
fifth switching element 39
rocker arm shaft 40
cylinder head 41
first pretensioning element 42
limiting element 43
engine cylinder 44a, 44b, 44c, 44d, 44e, 44f
inlet 45a, 45b, 45c, 45d, 45e
lubricant line 46
switching valve 47, 47a, 47b, 47c, 47d, 47e, 47f, 47g
second valve 48, 48a, 48b
third check valve arrangement 49
second pretensioning element 50
securing apparatus 51
roller 52
first retention element 53
first closing force element 54
first closing element 55
first opening force element 56
second connecting line 57
valve opening 58a
third auxiliary cylinder 59
third auxiliary piston 60
third opening force element 61
third closing force element 62
first locking piston 63
locking cylinder 64
limit groove 65
large lobe 66
small lobe 67
second check valve arrangement 68
high-pressure chamber 69 high-pressure line 70
second camshaft 71
valve control method 100
tapping of a first motion 101
providing a control pulse 102
selective control pulse feed 130
transmitting the first motion 104
closing a first check valve arrangement 105
control pulse feed 106
opening one of the first valves 107
opening both first valves 108
simultaneous actuation 109
pushing of the second rocker arm part 110
tapping of a second motion 111
selective control pulse feed 112
transmitting the second motion 113
selective control pulse feed 115
tapping of a fourth motion 116
selective control pulse feed 117
transmitting of motion 118
valve actuation method 200
first opening 201, 201a, 201b
second opening 202, 202a, 202b
first closing 203, 203a, 203b
second closing 204, 204a, 204b
third opening 205
valve lift H
first angle α
second angle β
control line connections A, B
pressure connection P
return flow connection T
intake valve opening curve I, I1, I2
exhaust valve opening curve E, E1, E2
decompression phase D1, D2
Miller cycle intake valve opening curve M
AGR exhaust valve opening curve AGR-E
first cylinder axis $Ax_1$
second cylinder axis $Ax_2$
first distance d1
second distance d2
gap S

What is claimed is:

1. A valve control method during different operating modes for selectively providing valve actuation using motion able to be transmitted from at least one camshaft to at least one first valve by means of a valve-actuating device, wherein the valve-actuating device comprises a first rocker arm component and a second rocker arm component, which are pivotably mounted independent of one another, and a first switching element positioned between the first rocker arm component and the second rocker arm component, the method comprising the following steps:

the first rocker arm component sliding or rolling over the at least one camshaft and the at least one camshaft induces a first motion on the first rocker arm component;

providing a control pulse by means of a control fluid or electrical lines;

selectively feeding the control pulse to the first switching element to selectively set a switching position of the first switching element to control a valve lift for the at least one first valve, wherein the switching position of the first switching element depends on a magnitude and/or a length of the control pulse such that the magnitude and/or the length of the control pulse produces a sustained switching position of the switching element, and wherein the magnitude and/or the length of the control pulse can be continuously varied to provide for continuous switching positions of the first switching element in order to provide for variable valve lift for the at least one first valve; and transmitting the first motion to the at least one first valve via the second rocker arm component depending on the sustained switching position of the first switching element.

2. The method according to claim 1, comprising the following further step:

closing a first check valve arrangement of the first switching element.

3. The method according to claim 1, wherein the valve-actuating device comprises a second switching element and the method comprises the following further step:

feeding the control pulse to the second switching element, wherein a switching position of the second switching element depends on the magnitude and/or the length of the control pulse.

4. The method according to claim 3, wherein the control pulse is fed to the second switching element prior to the first switching element.

5. The method according to claim 3, wherein the control pulse is fed to the second switching element and the first switching element simultaneously.

6. The method according to claim 3, wherein the valve-actuating device further comprises a valve bridge connecting at least two first valves, wherein a first stop of the second rocker arm component is arranged above one of the two first valves and/or a second stop of a fourth rocker arm component is substantially arranged centrically on the valve bridge, the method comprising the following further step:

pushing the second rocker arm component off from the valve bridge by means of the second switching element above the first stop such that the second stop is distanced from the valve bridge.

7. The method according to claim 1, wherein the valve-actuating device comprises at least two first valves and the method comprises the following further steps in a first operating mode:

opening one of the first valves; and thereafter
opening both first valves.

8. The method according to claim 1, wherein the valve-actuating device comprises at least two first valves and the method comprises the following further step in a second operating mode:

simultaneously actuating both first valves.

9. The method according to claim 1, wherein the valve-actuating device further comprises a third rocker arm component, a fourth rocker arm component, and a third switching element, the method comprising the following steps:

the third rocker arm component sliding or rolling over the at least one camshaft and the at least one camshaft induces a second motion on the third rocker arm component;

selectively feeding the control pulse to the third switching element to control the valve lift, wherein a position of the third switching element depends on the magnitude and/or the length of the control pulse; and transmitting the second motion to the at least one first valve via the fourth rocker arm component depending on the position of the third switching element.

10. The method according to claim 9, wherein the valve-actuating device further comprises a fifth rocker arm component, a sixth rocker arm component, and a fourth switching element, the method comprising the further following steps:

the fifth rocker arm component sliding or rolling over the at least one camshaft and the at least one camshaft induces a third motion on the fifth rocker arm component;

selectively feeding the control pulse to the fourth switching element to control the valve lift, wherein a position of the fourth switching element depends on the magnitude and/or the length of the control pulse; and transmitting the third motion to a second valve via the sixth rocker arm component depending on the position of the fourth switching element.

11. The method according to claim 10, wherein the control pulse is fed exclusively to the first switching element, the second switching element, and/or the fourth switching element in an engine braking mode of engine operation.

12. The method according to claim 10, wherein the control pulse is fed exclusively to the third switching element and/or the fourth switching element in a drive mode or a cylinder cut-off mode of engine operation.

13. The method according to claim 10, wherein the control pulse is fed exclusively to the second switching element, the third switching element, and/or the fourth switching element in an exhaust gas recirculation mode of engine operation.

14. The method according to claim 10, wherein the valve-actuating device further comprises a seventh rocker arm component, an eighth rocker arm component, and a fifth switching element, the method comprising the further following steps:

the seventh rocker arm component sliding or rolling over the at least one camshaft and the at least one camshaft induces a fourth motion on the seventh rocker arm component;

selectively feeding the control pulse to the fifth switching element to control the valve lift, wherein a position of the fifth switching element depends on the magnitude and/or the length of the control pulse; and transmitting the fourth motion to the second valve via the eighth rocker arm component depending on the position of the fifth switching element.

15. The method according to claim 14, wherein the control pulse is fed exclusively to the third switching element and/or the fifth switching element in a Miller cycle operating mode.

16. A computer program comprising commands which when executed by a control device realizes the method in accordance with claim 1.

17. A machine-readable medium on which the computer program in accordance with claim 16 is stored.

18. The method according to claim 1, wherein the magnitude and/or the length of the control pulse is variable, and wherein the magnitude of the control pulse corresponds to a predetermined pressure of the control fluid and the length of the control pulse corresponds to a duration of the predetermined pressure of the control fluid.

19. The method according to claim 18, wherein the control pulse is fed to the first switching element in a braking operating mode.

20. A valve control method during different operating modes for selectively providing valve actuation using motion able to be transmitted from at least one camshaft to at least one first valve by means of a valve-actuating device, wherein the valve-actuating device comprises a first rocker arm component and a second rocker arm component, which are pivotably mounted independent of one another, and a first switching element, the method comprising the following steps:

the first rocker arm component sliding or rolling over the at least one camshaft and the at least one camshaft induces a first motion on the first rocker arm component;

providing a control pulse;

the first switching element discretely or continuously setting a first angle between the first rocker arm component and the second rocker arm component relative to a rocker arm shaft, wherein the first angle is continuously variable;

selectively feeding the control pulse to the first switching element to selectively set a switching position of the first switching element to control a valve lift for the at least one first valve, wherein the switching position of the first switching element depends on a magnitude and/or a length of the control pulse such that the magnitude and/or the length of the control pulse produces a sustained switching position of the switching element, wherein the magnitude and/or the length of the control pulse can be continuously varied to provide for continuous switching positions of the first switching element in order to provide for variable valve lift for the at least one first valve, and wherein the control pulse is fed to the first switching element in a braking operating mode; and transmitting the first motion to the at least one first valve via the second rocker arm component depending on the sustained switching position of the first switching element.

21. The method according to claim 20, wherein the control pulse is transmitted by means of a control fluid or electrical lines.

* * * * *